(12) United States Patent
Hirohata

(10) Patent No.: US 8,351,706 B2
(45) Date of Patent: Jan. 8, 2013

(54) DOCUMENT EXTRACTING METHOD AND DOCUMENT EXTRACTING APPARATUS

(75) Inventor: Hitoshi Hirohata, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1179 days.

(21) Appl. No.: 12/178,482

(22) Filed: Jul. 23, 2008

(65) Prior Publication Data

US 2009/0028437 A1   Jan. 29, 2009

(30) Foreign Application Priority Data

Jul. 24, 2007   (JP) ................................. 2007-192192
Jun. 20, 2008   (JP) ................................. 2008-162324

(51) Int. Cl.
*G06K 9/46* (2006.01)

(52) U.S. Cl. ........ 382/192; 382/190; 382/209; 382/218; 382/235; 382/162; 348/129; 348/161; 348/179; 358/3.23; 358/448; 358/462; 358/530; 704/221; 704/236; 704/243; 704/247

(58) Field of Classification Search .................. None
See application file for complete search history.

(56) References Cited

U.S. PATENT DOCUMENTS

| | | | |
|---|---|---|---|
| 5,465,353 A | 11/1995 | Hull et al. | |
| 5,991,466 A | 11/1999 | Ushiro et al. | |

FOREIGN PATENT DOCUMENTS

| | | |
|---|---|---|
| JP | 05-037748 A | 2/1993 |
| JP | 07-282088 A | 10/1995 |
| JP | 2006-31181 A | 2/2006 |
| JP | 2006-163841 A | 6/2006 |
| JP | 2006-306735 | 11/2006 |
| JP | 2007-210013 | 8/2007 |
| JP | 2007-299210 A | 11/2007 |
| WO | WO-2006-092957 A1 | 9/2006 |

OTHER PUBLICATIONS

Philipp-Foliguet, S.; Logerot, G.; Constant, P.; Gosselin, P.H.; Lahanier, C.; , "Multimedia indexing and fast retrieval based on a vote system," Multimedia and Expo, 2006 IEEE International Conference on , vol., No., pp. 1781-1784, Jul. 9-12, 2006 doi: 10.1109/ICME.2006.262897 URL: http://ieeexplore.ieee.org/stamp/stamp.jsp?tp=&arnumber=4036966&isnu.*

* cited by examiner

*Primary Examiner* — Atiba O Fitzpatrick
*Assistant Examiner* — Thomas A James
(74) *Attorney, Agent, or Firm* — Birch, Stewart, Kolasch & Birch, LLP

(57) ABSTRACT

Document data corresponding to each page included in a document is stored, and furthermore, feature data indicative of a feature of the document data and a document index indicating the document are associated with the document data. A document extracting apparatus obtains input document data, calculates feature data from the input document data, judges similarity between the input document data and the document data based on the feature data, obtains a document index associated with document data similar to the input document data, and extracts a plurality of pieces of document data associated with the document index. Thus, document data concerning the document including a page corresponding to the document data similar to the input document data is extracted for a plurality of pages.

9 Claims, 20 Drawing Sheets

| DOCUMENT INDEX | PAGE INDEX | NUMBER OF PAGES |
|---|---|---|
| Doc1 | ID1, ID2, ID3 | 3 |
| Doc2 | ID4, ID5 | 2 |
| Doc3 | ID6, ID7, ID8, ID9 | 4 |
| Doc4 | ID10, ID11 | 2 |
| ⋮ | ⋮ | ⋮ |

FIG. 4

| −3 | −2 | −1 | 1  | −1 | −2 | −3 |
|----|----|----|----|----|----|----|
| −2 | −2 | 1  | 4  | 1  | −2 | −2 |
| −1 | 1  | 8  | 15 | 8  | 1  | −1 |
| 1  | 5  | 16 | 25 | 16 | 5  | 1  |
| −1 | 1  | 8  | 15 | 8  | 1  | −1 |
| −2 | −2 | 1  | 4  | 1  | −2 | −2 |
| −3 | −2 | −1 | 1  | −1 | −2 | −3 |

| DOCUMENT INDEX | PAGE INDEX | NUMBER OF PAGES |
|---|---|---|
| Doc1 | ID1, ID2, ID3 | 3 |
| Doc2 | ID4, ID5 | 2 |
| Doc3 | ID6, ID7, ID8, ID9 | 4 |
| Doc4 | ID10, ID11 | 2 |
| ⋮ | ⋮ | ⋮ |

FIG. 12

| FEATURE DATA | PAGE INDEX |
|---|---|
| 0 | ID1, ID3, ··· |
| 1 | ID2, ID5, ··· |
| 2 | ID1, ID2, ··· |
| ⋮ | ⋮ |
| 126 | ID3, ID7, ··· |

FIG. 17

| DOCUMENT INDEX | OUTPUT CONDITION | PAGE INDEX | NUMBER OF PAGES |
|---|---|---|---|
| Doc1 | NOTHING | ID1,ID2,ID3 | 3 |
| Doc2 | NOTHING | ID4,ID5 | 2 |
| Doc3 | NOTHING | ID6,ID7,ID8,ID9 | 4 |
| Doc4 | NOTHING | ID10,ID11 | 2 |
| ... | ... | ... | ... |
| Doc21 | ID21 AND ID25 ARE SIMILAR | ID21,ID22,ID23,ID24, ID25,ID26,ID27,ID28 | 8 |
| Doc51 | THREE OR MORE ARE SIMILAR | ID51,ID52,ID53, ID54,ID55 | 5 |
| ... | ... | ... | ... |

DOCUMENT EXTRACTING METHOD AND DOCUMENT EXTRACTING APPARATUS

CROSS-REFERENCE TO RELATED APPLICATIONS

This Nonprovisional application claims priority under 35 U.S.C. §119(a) on Patent Application No. 2007-192192 filed in Japan on Jul. 24, 2007 and Patent Application No. 2008-162324 filed in Japan on Jun. 20, 2008, the entire contents of which are hereby incorporated by reference.

BACKGROUND OF THE INVENTION

The present invention relates to a technique for searching a document database for a specific document, and more specifically relates to a document extracting method and a document extracting apparatus for searching, based on document data such as an image obtained by reading a document using a scanner, a database for document data corresponding to the read document.

Conventionally, there has been used a technique for storing, in a database, data obtained by reading a document including a text document, a photograph or the like using a scanner, or document data electronically created using a personal computer (PC), reading a new document, and extracting document data corresponding to the read document from the database. Proposed document data extracting methods, for example, include: a method in which a keyword is extracted from a read document using an OCR (Optical Character Reader), and document similarity is judged based on the keyword; and a method in which documents are restricted to formatted documents having ruled lines, and features of the ruled lines are extracted to judge document similarity.

Japanese Patent Application Laid-Open No. 7-282088 discloses a technique for associating descriptors for characterizing documents (text documents) with a list of documents characterized by the descriptors, generating a descriptor from a read document (input text document), and performing document matching using the generated descriptor. A document descriptor is defined as being unchangeable for distortion and the like, which is caused as a document is read. A plurality of descriptors are generated for one document, voting is performed for documents associated with the respective descriptors generated from read documents, and a document having the greatest number of votes or a document having the number of votes exceeding a predetermined threshold value is selected.

Japanese Patent Application Laid-Open No. 5-37748 discloses a technique for storing document image data in advance, and performing pattern matching for each bit between bitmap data of a read document and bitmap data of the document stored in advance, thereby performing document search. Japanese Patent Application Laid-Open No. 5-37748 also discloses that in the case of a document including a plurality of pages, only a cover page may be read for search, and image data of the read page may be compared with image data of a first page of each document stored, thereby performing document search.

Japanese Patent Application Laid-Open No. 2006-31181 discloses a technique for storing text document images in advance, comparing a feature of a read document image with features of all the pages of the stored text document images to judge similarity therebetween, and extracting a text document image having similarity higher than a threshold value, thereby performing text document image search. In this technique, when a plurality of text document images become candidates, the text document images are displayed to receive user's selection, and when the average of similarity of pages included in a text document image is below a threshold value, this text document image is deleted from the candidates to narrow down the selection.

SUMMARY OF THE INVENTION

Normally, a document such as a text document often includes a plurality of pages. The conventional techniques, typified by the technique disclosed in Japanese Patent Application Laid-Open No. 7-282088, are each capable of extracting desired document data from a database by performing matching with a document read by a scanner; however, as for a document including a plurality of pages, document data must be extracted by performing matching for each page. Accordingly, if a document, with which matching is performed, has a missing part due to loss or soil, for example, there occurs a problem that document data concerning a document including a plurality of pages cannot be extracted for all the pages. Japanese Patent Application Laid-Open No. 7-282088 does not disclose any solution to this problem whatsoever.

Further, in the technique as disclosed in Japanese Patent Application Laid-Open No. 5-37748 in which comparison is made with bitmap data of a document including a plurality of pages, the comparison is made for each page; therefore, there occurs a problem that the time required for the comparison process is increased with increase in the number of pages included in a document and the number of documents. Furthermore, when bitmap data comparison is made, it is necessary to accurately carry out the alignment of two pieces of image data to be compared. However, in reality, it is difficult to accurately carry out the alignment, resulting in a problem that it is impossible to perform accurate document search.

Besides, in the technique disclosed in Japanese Patent Application Laid-Open No. 2006-31181, a character code is extracted as a feature of a text segment of a text document image using an OCR; therefore, there occurs a problem that the accuracy of similarity judgment might be degraded depending on the character code to be extracted. In order to make up for this accuracy degradation, extraction of a large number of character codes may be considered. But in that case, memory capacity for storing the character codes is increased, and furthermore, the search is performed using a large amount of data; therefore, there occurs a problem that the time required for the process is increased. Moreover, in the techniques of Japanese Patent Application Laid-Open No. 5-37748 and Japanese Patent Application Laid-Open No. 2006-31181, no consideration is given to the search of a document including secret information; therefore, there occurs a problem that a document including secret information might be easily outputted.

The present invention has been made in view of the above-described circumstances, and its object is to provide a document extracting method and a document extracting apparatus, which allow, based on a part of a document, extraction of data of the other part of the document, thereby making it possible to easily extract, from a database, document data concerning a document including a plurality of pages.

Another object of the present invention is to provide a document extracting method and a document extracting apparatus, which are capable of avoiding, when document data is extracted, committing a folly that document data different from the target data is erroneously extracted.

Still another object of the present invention is to provide a document extracting method and a document extracting apparatus, which are capable of protecting secret information by setting a condition for outputting a document.

A document extracting apparatus according to the present invention is a document extracting apparatus, including document storage means for storing document data, for extracting specific document data from the document data stored in the document storage means, the apparatus including: means for storing a document index, indicating a document including a plurality of pages, in association with document data corresponding to each page included in the document; feature data storage means for storing feature data, calculated based on a feature point extracted from document data and indicative of a feature of the document data, in association with the document data; obtaining means for obtaining input document data serving as new document data; means for extracting a feature point from the input document data obtained by the obtaining means; generation means for generating, based on the feature point extracted by this means, feature data indicative of a feature of the input document data; judgment means for comparing the feature data, generated by the generation means, with the feature data stored in the feature data storage means, thereby judging similarity between the document data associated with the feature data stored in the feature data storage means, and the input document data; means for obtaining a document index associated with document data that is judged as document data highly similar to the input document data by the judgment means; and extracting means for extracting a plurality of pieces of document data corresponding to a plurality of pages included in a document indicated by the document index obtained by the document index obtaining means.

In the present invention, document data corresponding to each page included in a document is stored, and furthermore, feature data, calculated based on a feature point extracted from the document data and indicative of a feature of the document data, and a document index indicating the document are stored in association with the document data. The document extracting apparatus generates, when input document data is obtained, feature data from the input document data, judges similarity between the input document data and the document data based on the feature data, obtains a document index associated with document data highly similar to the input document data, and extracts a plurality of pieces of document data associated with the obtained document index. Thus, a document, including a page corresponding to the document data judged as being similar to the input document data, is specified, and furthermore, document data corresponding to all the pages included in the specified document is extracted.

In the present invention, based on the input document data corresponding to a part of a document including a plurality of pages, document data corresponding to all the pages of the document can be extracted. Accordingly, even if a document including a plurality of pages has a missing part due to loss or soil, for example, it is possible to easily extract document data for all the pages from a database in which the document data is stored in advance.

In the document extracting apparatus according to the present invention, the feature data storage means is configured to store, in association with one piece of document data, a plurality of pieces of feature data indicative of a feature of this document data, the generation means is configured to generate a plurality of pieces of feature data indicative of a feature of input document data, and the judgment means has: means for voting, for each of a plurality of pieces of the feature data generated by the generation means, for document data associated with feature data identical to the feature data; and means for deciding, as document data highly similar to the input document data, document data having the greatest number of votes or document data having the number of votes equal to or greater than a predetermined amount, among the document data stored in the document storage means.

In the present invention, in order to judge document data similarity, the document extracting apparatus stores a plurality of pieces of feature data for one piece of document data, votes for document data associated with the same feature data for each piece of feature data generated for the input document data, and judges, as the document data highly similar to the input document data, the document data having the greatest number of votes or the number of votes equal to or greater than a predetermined amount. Since the document data, having a large number of pieces of identical feature data among the plurality of pieces of the feature data, is judged as having high similarity, more accurate similarity judgment can be carried out. In judging the document data similarity, more accurate similarity judgment can be carried out based on a plurality of pieces of feature data, and therefore, document data not similar to the input document data can be prevented from being erroneously judged as highly similar document data.

In the document extracting apparatus according to the present invention, the obtaining means has means for obtaining a plurality of pieces of input document data, the judgment means has means for judging, for each if a plurality of pieces of the input document data, similarity between the document data stored in the document storage means and the input document data, and the extracting means has means for extracting, when document index associated with document data highly similar to each of a plurality of pieces of the input document data is identical to each other, a plurality of pieces of document data corresponding to a plurality of pages included in a document indicated by the document index.

In the present invention, when a plurality of pieces of input document data are obtained and document index associated with document data highly similar to respective pieces of input document data is identical, the document extracting apparatus extracts a plurality of pieces of document data associated with the identical document index. Thus, one document can be extracted based on a plurality of pages. Hence, the possibility of erroneously extracting document data different from the target data can be further reduced. For example, even if documents similar to each other exist, the target document data can be extracted.

The document extracting apparatus according to the present invention further includes means for requesting further input document data when a plurality of document indices associated with document data highly similar to input document data have been obtained, or when a plurality of document indices common to a plurality of pieces of the input document data, among document indices associated with document data highly similar to each of a plurality of pieces of the input document data, have been obtained.

In the present invention, when there exist a plurality of document indices associated with document data highly similar to input document data, the document extracting apparatus further requests input document data corresponding to the other page of the document. Thus, the input document data corresponding to the other page of the document is further obtained, and the document indices are narrowed down by utilizing also the other page of the document. The utilization of a plurality of pages makes it possible to perform more accurate similarity judgment, and to extract desired document data with high precision.

In the document extracting apparatus according to the present invention, the obtaining means is configured to obtain input document data by optically reading a document.

In the present invention, the document extracting apparatus includes, as the obtaining means for obtaining input document data, a scanner for optically reading a document; thus, document data is extracted by reading a part of a document using the scanner. By reading a part of a document using the scanner, for example, document data stored in a server device connected via a communication network can be extracted, and data of the entire document can be easily obtained from a part of the document including a photograph, a text document or the like.

The document extracting apparatus according to the present invention further includes: means for storing, in association with a document index, a predetermined output condition necessary for outputting document data corresponding to each page included in a document indicated by the document index; means for determining whether an output condition, associated with a document index associated with document data extracted by the extracting means, is satisfied; means for outputting, when the output condition is determined to be satisfied, a plurality of pieces of document data corresponding to a plurality of pages included in a document indicated by the document index; and means for inhibiting, when the output condition is determined to be not satisfied, output of a plurality of pieces of document data corresponding to a plurality of pages included in a document indicated by the document index.

In the present invention, the document extracting apparatus sets an output condition in advance for each document index, and outputs document data when the output condition is satisfied, but inhibits the output of document data when the output condition is not satisfied; thus, only a document corresponding to a document index for which the output condition is satisfied is outputted. Since the output of a document is enabled when the output condition is satisfied, the output condition is set for an important document, thereby making it possible to prevent the important document from being easily outputted, and to protect secret information included in the document.

The document extracting apparatus according to the present invention further includes means for forming a plurality of images based on a plurality of pieces of the document data extracted by the extracting means.

In the present invention, the document extracting apparatus includes means for forming an image based on document data, thereby making it possible to form an image based on the extracted document data. An image forming apparatus such as a multifunction peripheral including a digital copier or a scanner is used to make it possible to form an image based on document data extracted from the document data stored in the image forming apparatus or the document data stored in a server device connected via a communication network to the image forming apparatus. Therefore, the image formation allows a document including a photograph, a text document or the like to be easily obtained.

A computer program according to the present invention is a control program for implementing the above-described document extracting apparatus by a computer.

A computer-readable memory product according to the present invention stores the above-described computer program.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory diagram showing an example of a spatial filter utilized in a filtering section;

FIG. 11 is a conceptual diagram showing exemplary contents of a document table that associates document data, stored in the storage section, with documents;

FIG. 12 is a conceptual diagram showing exemplary contents of a feature table that associates document data, stored in the storage section, with feature data;

FIG. 17 is a conceptual diagram showing exemplary contents of a document table that associates document data, stored in the storage section, with documents;

DETAILED DESCRIPTION OF THE INVENTION

Hereinafter, the present invention will be described with reference to the drawings illustrating embodiments thereof.
Embodiment 1

Figure 1:
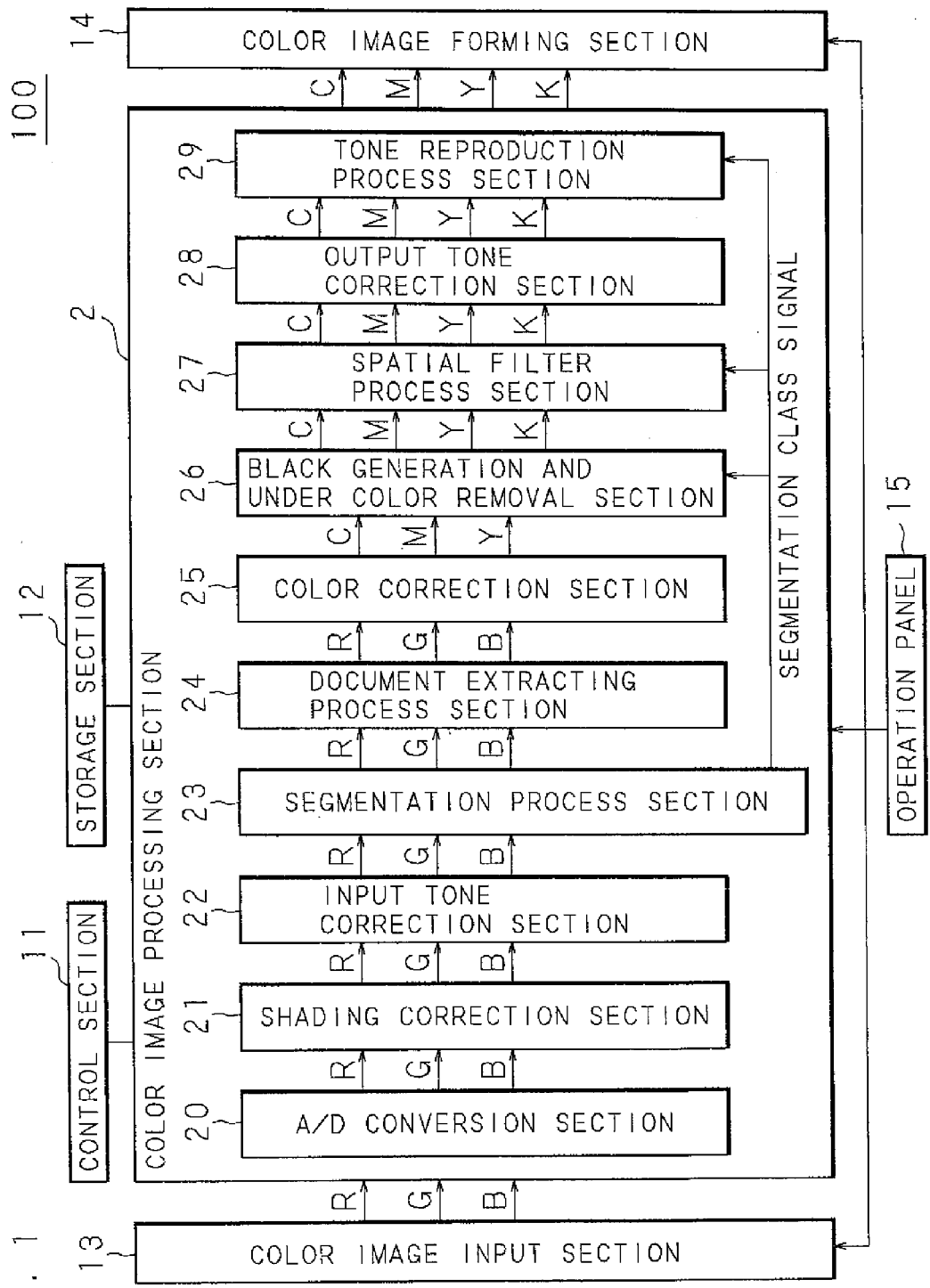
FIG. 1 is a block diagram showing a functional configuration of an inner part of a document extracting apparatus.

Embodiment 1 will be described as an embodiment in which a document extracting apparatus of the present invention serves as an image forming apparatus for forming a color image. FIG. 1 is a block diagram showing a functional configuration of an inner part of a document extracting apparatus 100 according to Embodiment 1 of the present invention. The document extracting apparatus 100 of the present invention includes: a control section 11 for controlling the operations of respective sections constituting the document extracting apparatus 100; a storage section 12 formed by a semiconductor memory or a hard disk, for example; and a color image input section 13 for optically reading a color image. The color image input section 13 is connected with a color image processing section 2 for performing a process of generating image data in accordance with a read color image. The color image input section 13 reads, as a color image, a document including a photograph, a text document or the like, and the storage section 12 stores document data, which is image data read from the document by the color image input section 13 and generated by the color image processing section 2. The storage section 12 functions as a document storage section in the present invention, and the color image input section 13 functions as a document data obtaining section in the present invention. Further, the color image processing section 2 is connected with a color image forming section 14 for forming a color image based on image data generated by the color image processing section 2. The color image input section 13, the color image processing section 2, and the color image forming section 14 are connected with an operation panel 15 for receiving a manipulation performed by a user.

The color image input section 13 includes a scanner provided with a CCD (Charge Coupled Device), decomposes a reflected light image from a document, which is a color image formed on a recording medium such as a paper, into R (red), G (green) and B (blue) colors to read them by the CCD, and converts them into RGB analog signals to output the signals to the color image processing section 2. The color image processing section 2 performs after-mentioned image processing on the RGB analog signals inputted from the color image input section 13 to generate digital image data, and further generates image data consisting of digital C (cyan), M (magenta), Y (yellow) and K (black) signals to output the image data to the color image forming section 14. Based on the image data inputted from the color image processing section 2, the color image forming section 14 forms a color image using a method such as thermal transfer, electrophotography, or ink-jet printing. The operation panel 15 includes: a display section such as a liquid crystal display for displaying information necessary for the manipulation of the document extracting apparatus 100; and a reception section such as a touch panel or a numeric keypad for receiving, by the user's manipulation, an instruction for controlling the operation of the document extracting apparatus 100.

The color image processing section 2 converts the analog signals, inputted from the color image input section 13, into digital signals through an A/D conversion section 20. Then, the color image processing section 2 sends the signals to: a shading correction section 21; an input tone correction section 22; a segmentation process section 23; a document extracting process section 24; a color correction section 25; a black generation and under color removal section 26; a spatial filter process section 27; an output tone correction section 28; and a tone reproduction process section 29 in this order, and outputs the image data consisting of the digital CMYK signals to the color image forming section 14.

The A/D conversion section 20 receives the RGB analog signals inputted from the color image input section 13 to the color image processing section 2, converts the RGB analog signals into digital RGB signals, and then outputs the RGB signals to the shading correction section 21. The shading correction section 21 performs, on the RGB signals inputted from the A/D conversion section 20, a process of removing various kinds of distortions generated in the illumination system, the image focusing system, and the image sensing system of the color image input section 13. The shading correction section 21 outputs the RGB signals, from which the distortions have been removed, to the input tone correction section 22.

The input tone correction section 22 performs color balance adjustment on the RGB signals inputted from the shading correction section 21. Furthermore, the RGB signals inputted from the shading correction section 21 to the input tone correction section 22 are RGB reflectivity signals, and the input tone correction section 22 converts the RGB signals, inputted from the shading correction section 21, to signals such as density (pixel value) signals, which are easily processed in the color image processing section 2. The input tone correction section 22 outputs the processed RGB signals to the segmentation process section 23.

The segmentation process section 23 divides each pixel in the image, represented by the RGB signals inputted from the input tone correction section 22, into a text component, a halftone component, or a photograph (continuous tone) component, and outputs a segmentation class signal indicating that each pixel belongs to which segment (component), to the black generation and under color removal section 26, the spatial filter process section 27 and the tone reproduction process section 29 based on the division result. The segmentation process section 23 further outputs the RGB signals, inputted from the input tone correction section 22, to the document extracting process section 24.

The document extracting process section 24 is connected to the storage section 12, and executes a process of inputting/outputting document data, which is image data consisting of RGB signals, from/to the storage section 12, and a process concerning the inventive document extracting method described later. The document extracting process section 24 further outputs the image data, consisting of the RGB signals inputted from the segmentation process section 23, or the image data, which is document data inputted from the storage section 12, to the color correction section 25. It should be noted that, instead of providing the document extracting process section 24 at a subsequent stage of the segmentation process section 23, the document extracting apparatus 100 may be embodied so that the document extracting process section 24 is provided in parallel with the input tone correction section 22.

The color correction section 25 converts the RGB signals, inputted from the document extracting process section 24, to CMY signals, and performs a process of removing, from the CMY signals, color impurity based on the spectral characteristics of the CMY color materials containing unnecessary absorption components, in order to realize faithful color reproduction. Then, the color correction section 25 outputs the CMY signals, which have been subjected to color correction, to the black generation and under color removal section 26.

The black generation and under color removal section 26 performs a black generation process for generating a K signal from the CMY three-color signals inputted from the color correction section 25, and subtracts the K signal, obtained by the black generation process, from the original CMY signals, thereby converting the CMY three-color signals into CMYK four-color signals. As an example of the black generation process, a method of performing black generation by skelton black is known. In this method, converted data C', M', Y', and K' is expressed by the following equations, where y=f(x) represents the input-output characteristics of a skelton curve, C, M and Y represent data prior to conversion, and $\alpha$ ($0<\alpha<1$) represents a UCR (Under Color Removal) rate:

$$K'=f(\min(C, M, Y))$$

$$C'=C-\alpha K'$$

$$M'=M-\alpha K'$$

$Y' = Y - \alpha K'$

It is to be noted that the UCR rate, i.e., $\alpha$ ($0<\alpha<1$), signifies the extent to which CMY are reduced by replacing a portion in which CMY are overlapped with K. The first equation shown above signifies that a K signal is generated in accordance with the smallest signal intensity among the respective CMY signal intensities. The black generation and under color removal section 26 outputs the CMYK signals, obtained by converting the CMY signals, to the spatial filter process section 27.

The spatial filter process section 27 performs, on the image represented by the CMYK signals inputted from the black generation and under color removal section 26, a spatial filtering process using a digital filter based on the segmentation class signal inputted from the segmentation process section 23, thereby alleviating blurring or graininess degradation of the image. For example, for a region divided into a text component by the segmentation process section 23, the spatial filter process section 27 performs a spatial filtering process using a filter through which a high frequency component is greatly enhanced, in order to improve the text reproducibility. On the other hand, for a region divided into a halftone component by the segmentation process section 23, the spatial filter process section 27 performs a low-pass filtering process for removing an input halftone component. Then, the spatial filter process section 27 outputs the processed CMYK signals to the output tone correction section 28.

The output tone correction section 28 performs, on the CMYK signals inputted from the spatial filter process section 27, an output tone correction process for converting the signals into a halftone area rate which is a characteristic value of the color image forming section 14, and outputs the CMYK signals, which have been subjected to the output tone correction process, to the tone reproduction process section 29.

The tone reproduction process section 29 performs, on the CMYK signals inputted from the output tone correction section 28, a process for allowing the tone to be represented in accordance with the region, based on the segmentation class signal inputted from the segmentation process section 23. For example, for a region divided into a text component by the segmentation process section 23, the tone reproduction process section 29 performs binarization or a multi-level dithering process using a high-resolution screen suitable for the reproduction of a high frequency component. On the other hand, for a region divided into a halftone component by the segmentation process section 23, the tone reproduction process section 29 performs a tone reproduction process in which the image is finally divided into pixels and processed so as to reproduce each tone. The tone reproduction process section 29 outputs the processed image data to the color image forming section 14.

Based on the image data consisting of the CMYK signals inputted from the color image processing section 2, the color image forming section 14 forms a CMYK color image on a recording medium such as a paper. By forming the image based on the image data serving as document data, the color image forming section 14 outputs a document including a photograph, a text document or the like.

Figure 2:
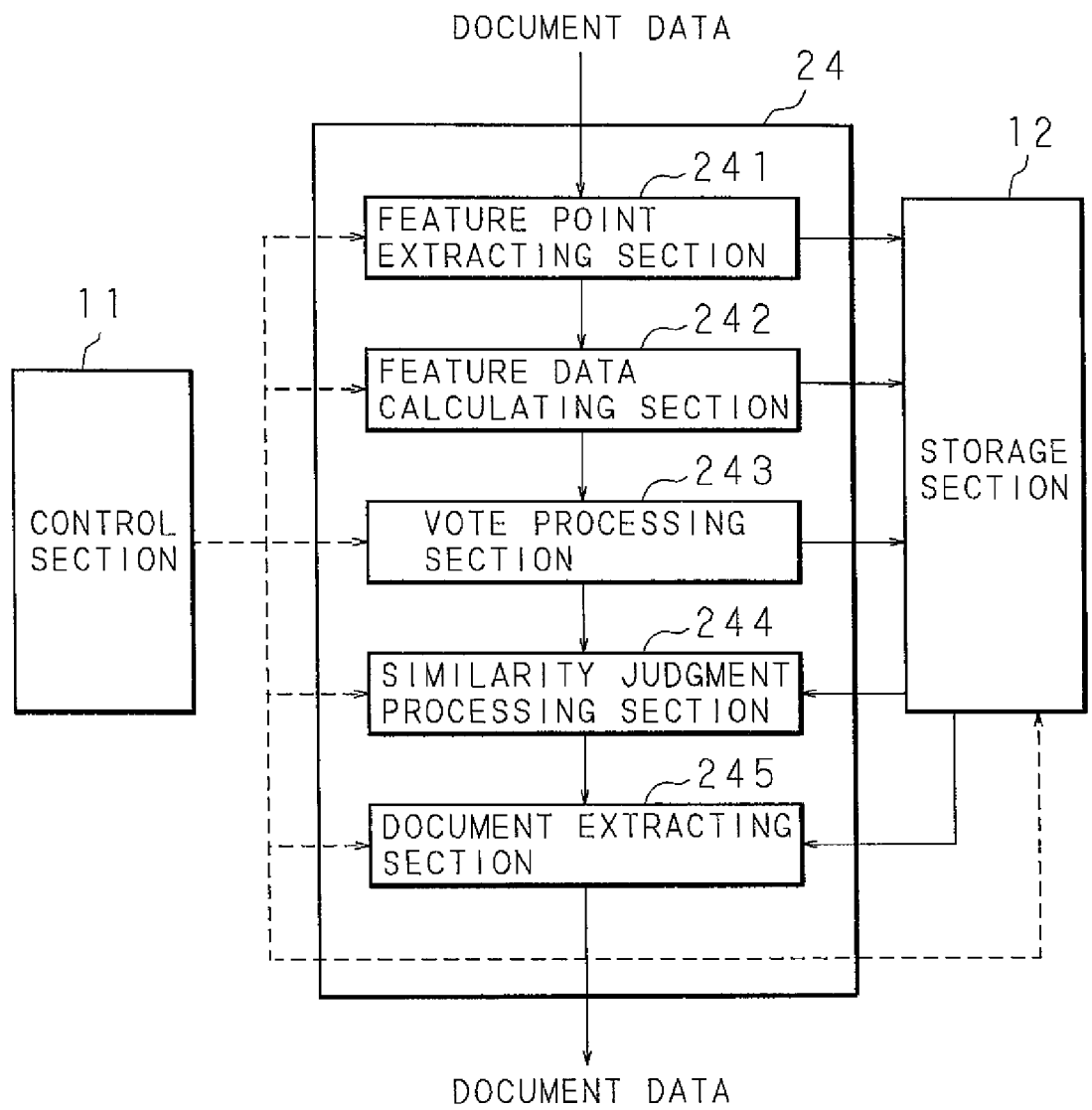
FIG. 2 is a block diagram showing a configuration of a document extracting process section.

Next, a configuration of the document extracting process section 24 and processes performed by the document extracting process section 24 will be described. FIG. 2 is a block diagram showing a configuration of the document extracting process section 24. The document extracting process section 24 includes: a feature point extracting section 241 for extracting a feature point corresponding to a character, a graphic or the like on a document represented by inputted document data; a feature data (feature vector) calculating section 242 for calculating, from the feature point, feature data indicative of a document data feature; a vote processing section 243 for voting for document data stored in the storage section 12 based on the feature data; a similarity judgment processing section 244 for judging document data similarity based on the voting result; and a document extracting section 245 for extracting specific document data from the storage section 12.

Figure 3:
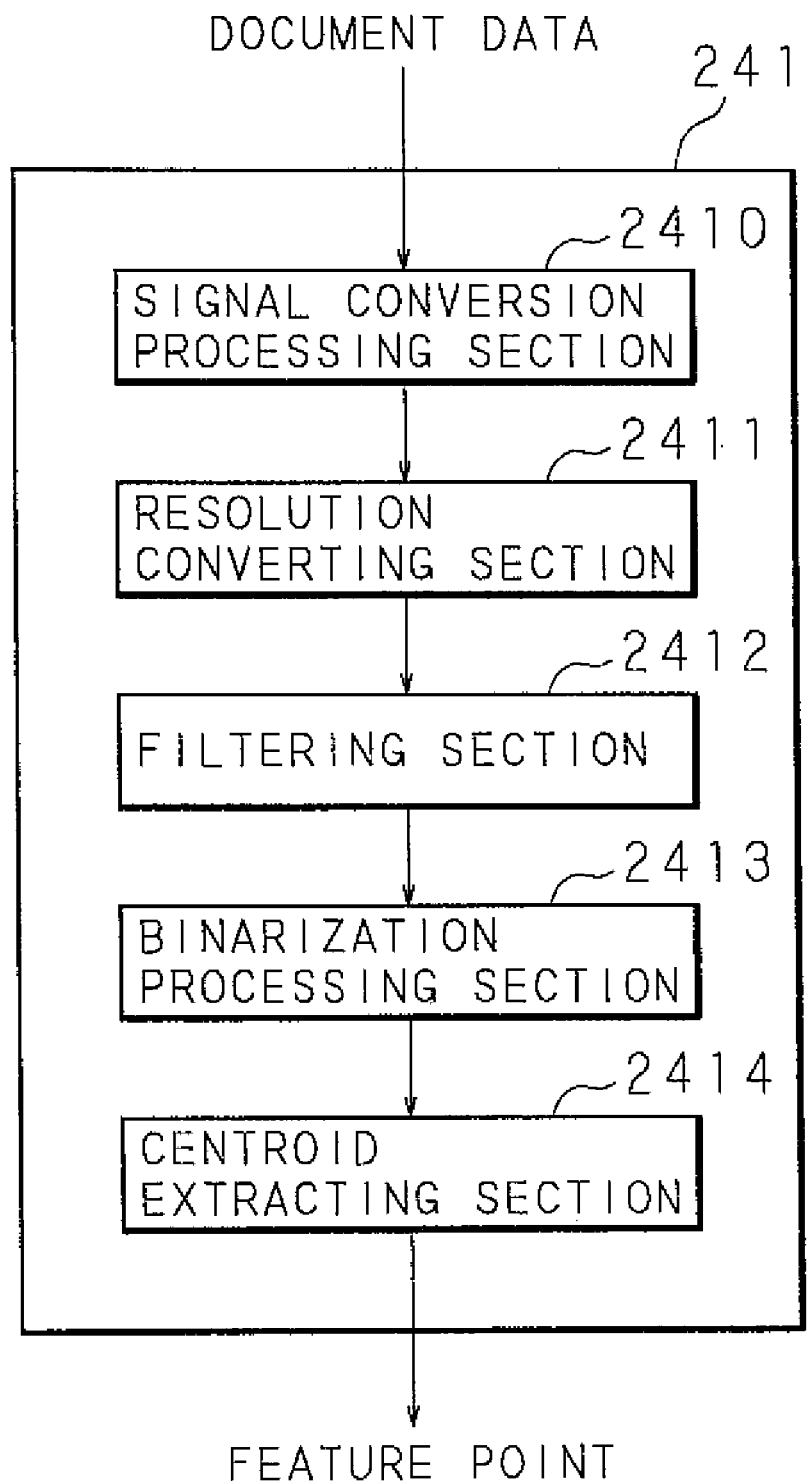
FIG. 3 is a block diagram showing a configuration of a feature point extracting section.

FIG. 3 is a block diagram showing a configuration of the feature point extracting section 241. The feature point extracting section 241 includes: a signal conversion processing section 2410 for achromatizing the document data; a resolution converting section 2411 for converting the resolution of the document data into a predetermined resolution; a filtering section 2412 for correcting the spatial frequency characteristics of the document data; a binarization processing section 2413 for binarizing the document data; and a centroid extracting section 2414 for extracting a centroid of a character or the like.

When the inputted document data is color image data, the signal conversion processing section 2410 achromatizes the color image to convert it into a luminance signal or a lightness signal, and outputs the converted document data to the resolution converting section 2411. For example, a luminance signal Y can be expressed by the following equation: $Yj = 0.30 \times Rj + 0.59 \times Gj + 0.11 \times Bj$, where $Rj$, $Gj$ and $Bj$ represent the intensities of RGB color components of each pixel, and $Yj$ represents the luminance of each pixel. Alternatively, as the other method, a method of achromatizing the color image by converting the RGB signals into CIE (Commission International de l'Eclairage) 1976 L*a*b* signals may be utilized.

The resolution converting section 2411 performs magnification on the document data to convert the resolution of the document data so that the resolution of the inputted document data becomes a predetermined resolution, and outputs the document data to the filtering section 2412. Thus, even if the document has been subjected to optical magnification by the color image input section 13 and the resolution of the document data has been changed, it is possible to carry out feature point extraction without being influenced by this change. Furthermore, the resolution converting section 2411 converts the resolution into a resolution lower than the resolution read by the color image input section 13 at the same magnification. For example, document data read at 600 dpi (dot per inch) by the color image input section 13 is converted into data of 300 dpi. Thus, the subsequent throughput can be reduced.

The filtering section 2412 corrects the spatial frequency characteristics of the inputted document data by performing an enhancement process, a smoothing process and the like on the image, and outputs the corrected image to the binarization processing section 2413. The processes of the filtering section 2412 are performed in order to absorb the difference in the spatial frequency characteristics of the color image input section 13, which is caused depending on the type thereof. In the image signal outputted from the CCD of the color image input section 13, there occurs image blurring degradation due to, for example, an optical system component such as a lens or a mirror, the aperture of a light receiving surface of the CCD, transfer efficiency, an after image, integral effect caused by physical scanning, and/or inconsistent scanning. The filtering section 2412 performs a process of enhancing a boundary, an edge or the like, thereby remedying the degradation caused in the document data. In addition, the filtering section 2412 performs a smoothing process so as to suppress the high frequency component unnecessary for a process of extracting a feature point to be processed subsequently.

FIG. 4 is an explanatory diagram showing an example of a spatial filter utilized by the filtering section 2412. As shown in this diagram, the spatial filter has a size of 7×7, for example, and is a mixed filter used to perform an enhancement process and a smoothing process. The pixels of the inputted document data are scanned, and a computation process is performed on all the pixels using the spatial filter. It should be noted that the size of the spatial filter is not limited to a size of 7×7, but the spatial filter may have a size of 3×3, or 5×5, for example. Further, the filter factor values are each shown as an example, and are not limited to the values shown in the diagram; alternatively, the filter factor values may be appropriately set in accordance with the type, characteristic or the like of the color image input section 13.

The binarization processing section 2413 makes a comparison between the luminance value or lightness value of each pixel, included in the inputted document data, and a predetermined threshold value, thus binarizing the document data, and outputting the binary document data to the centroid extracting section 2414.

The centroid extracting section 2414 performs labeling for assigning a label to each pixel of the document data inputted from the binarization processing section 2413 in accordance with the binary pixel value. Specifically, labels are classified into two kinds of labels, and when a pixel value is represented by "0" or "1", one of the labels is assigned to a pixel "0", while the other label is assigned to a pixel "1". Then, the centroid extracting section 2414 specifies a connected component where pixels, to which the same labels are assigned, are connected, extracts a centroid of the specified connected component as a feature point, and outputs the extracted feature point to the feature data calculating section 242. It should be noted that a feature point can be denoted by coordinate values on a binary image represented by document data.

Figure 5:
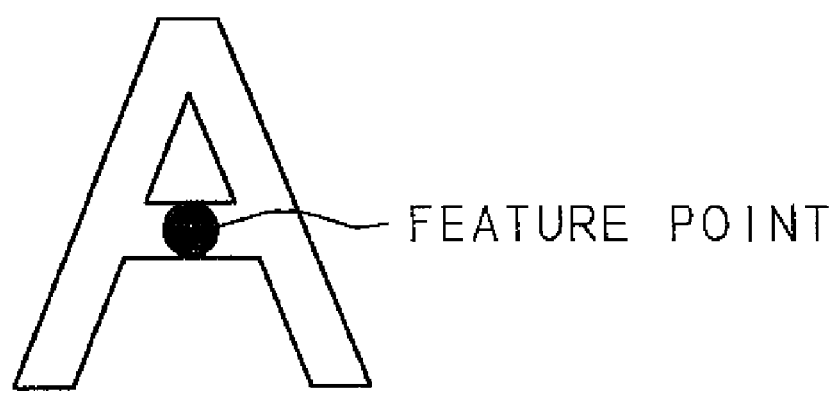
FIG. 5 is an explanatory diagram showing an example of a feature point of a connected component.
Figure 6:
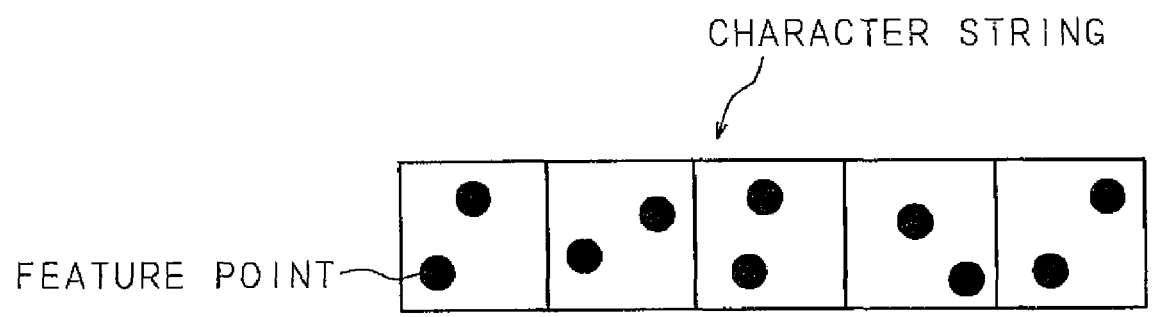
FIG. 6 is an explanatory diagram showing exemplary feature point extraction results for a character string.

FIG. 5 is an explanatory diagram showing an example of a feature point of a connected component. In FIG. 5, the specified connected component is a character "A", and is specified as a set of pixels to which the same labels are assigned. The position of the centroid of this character "A" coincides with the position indicated by the black circle in FIG. 5, and this centroid serves as a feature point. FIG. 6 is an explanatory diagram showing exemplary feature point extraction results for a character string. In the case of a character string including a plurality of characters, feature points are each extracted at a different position depending on the type of a character. A feature point can be extracted not only for a character, but also for a graphical or photographic portion in the similar manner. It should be noted that the feature point extraction method described in this embodiment is just an example, and the other method may be used to extract a feature point. For example, a process of breaking down a character string into words to extract a centroid of each word as a feature point may be performed.

Based on the feature point inputted from the feature point extracting section 241, the feature data calculating section 242 performs a process of calculating feature data indicative of a feature of the inputted document data. An example of feature data calculation will be described below. The feature data calculating section 242 sequentially determines, as a current feature point, each of the feature points inputted from the feature point extracting section 241, and extracts the other four feature points adjacent to the current feature point.

Figure 7:
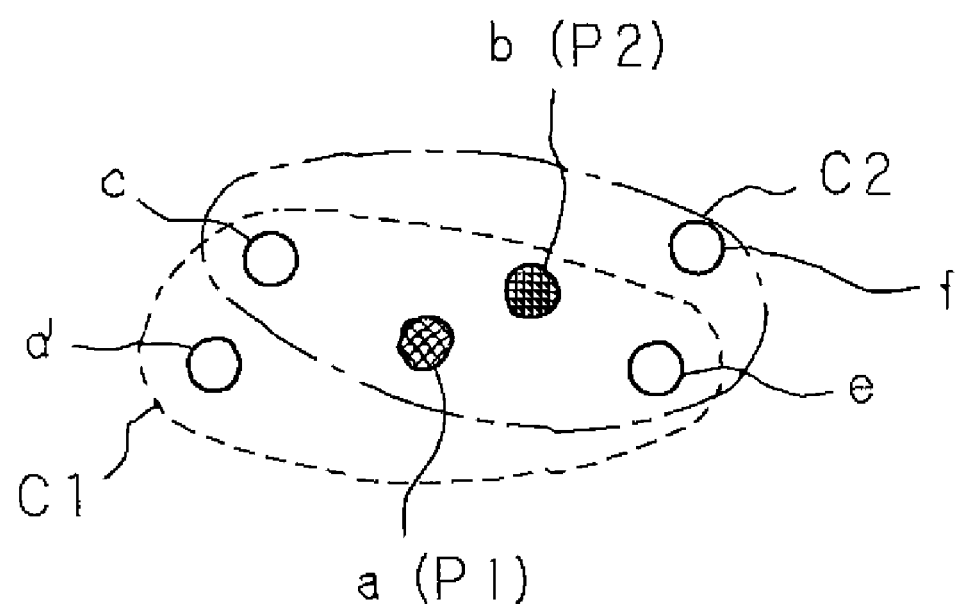
FIG. 7 is an explanatory diagram showing current feature points and extracted feature points.

FIG. 7 is an explanatory diagram showing current feature points and extracted feature points. As shown in FIG. 7, the feature data calculating section 242 determines one feature point as a current feature point, and extracts a predetermined number (in this case, four) of surrounding feature points adjacent to this current feature point in ascending order of distance from the current feature point. In the example shown in FIG. 7, when a feature point "a" is determined as a current feature point P1, feature points "b", "c", "d" and "e" surrounded by a closed curve C1 in this diagram are extracted as the four surrounding feature points, and when a feature point "b" is determined as a current feature point P2, feature points "a", "c", "e" and "f" surrounded by a closed curve C2 in this diagram are extracted as the four surrounding feature points.

Further, the feature data calculating section 242 extracts, from among the extracted four surrounding feature points, a combination of three points. FIGS. 8A to 8D are explanatory diagrams each showing an example in which three surrounding feature points are extracted with respect to the current feature point P1 to calculate feature data As shown in FIGS. 8A to 8D, when the feature point "a" shown in FIG. 7 is determined as the current feature point P1, all the combinations of the three points selected from among the surrounding feature points "b", "c", "d" and "e" are extracted. In other words, a combination of the surrounding feature points "b", "c" and "d", a combination of the surrounding feature points "b", "c" and "e", a combination of the surrounding feature points "b", "d" and "e", and a combination of the surrounding feature points "c", "d" and "e" are extracted.

Next, for each of the combinations extracted, the feature data calculating section 242 calculates an invariant (one of features) Hij for geometric deformation. It is to be noted that i is a number indicative of a current feature point (i is an integer equal to or greater than 1), and j is a number indicative of a combination of three surrounding feature points (j is an integer equal to or greater than 1). In the present embodiment, the ratio between the two lengths, selected from among the lengths of line segments connecting the surrounding feature points, is defined as the invariant Hij. It should be noted that the length of each line segment may be calculated based on coordinate values of the respective surrounding feature points.

Figure 8A:
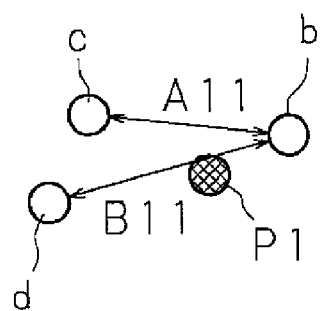
FIGS. 8A to 8D are explanatory diagrams each showing an example in which three surrounding feature points are extracted with respect to a current feature point P1 to calculate feature data.
Figure 8B:
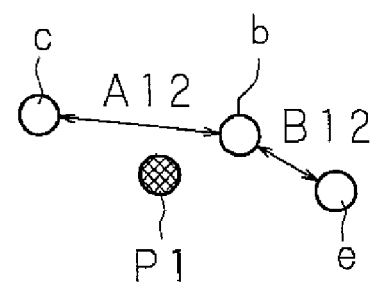
Figure 8C:
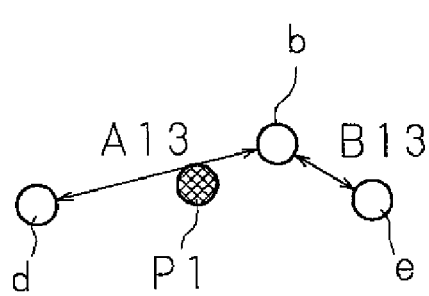
Figure 8D:
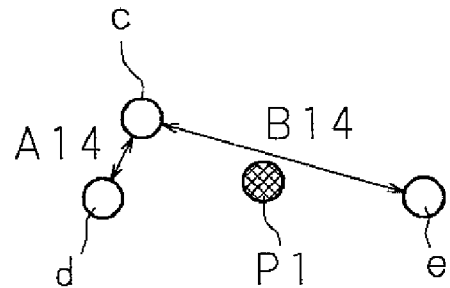

For example, in the example shown in FIG. 8A, the length of a line segment connecting the feature point "b" and the feature point "c" is defined as A11, and the length of a line segment connecting the feature point "b" and the feature point "d" is defined as B11, thus determining an invariant H11 by the following equation: H11=A11/B11. Further, in the example shown in FIG. 8B, the length of a line segment connecting the feature point "b" and the feature point "c" is defined as A12, and the length of a line segment connecting the feature point "b" and the feature point "e" is defined as B12, thus determining an invariant H12 by the following equation: H12 A12/B12. Furthermore, in the example shown in FIG. 8C, the length of a line segment connecting the feature point "b" and the feature point "d" is defined as A13, and the length of a line segment connecting the feature point "b" and the feature point "e" is defined as B13, thus determining an invariant H13 by the following equation: H13=A13/B13. Moreover, in the example shown in FIG. 8D, the length of a line segment connecting the feature point "c" and the feature point "d" is defined as A14, and the length of a line segment connecting the feature point "c" and the feature point "e" is defined as B14, thus determining an invariant H14 by the following equation: H14=A14/B14.

In the examples shown in FIGS. 8A to 8D, the invariants H11, H12, H13 and H14 are calculated in this manner. In the above-described examples, a combination of the three surrounding feature points, consisting of the nearest feature point, the second nearest feature point and the third nearest feature point to the current feature point, is represented by j=1, a combination of the three surrounding feature points, consisting of the nearest feature point, the second nearest feature point and the fourth nearest feature point to the current feature point, is represented by j=2, a combination of the three surrounding feature points, consisting of the nearest feature point, the third nearest feature point and the fourth nearest feature point to the current feature point, is represented by j=3, and a combination of the three surrounding feature points, consisting of the second nearest feature point, the third nearest feature point and the fourth nearest feature point to the current feature point, is represented by j=4. Furthermore, among the three surrounding feature points, a line segment, connecting the nearest surrounding feature point and the second nearest surrounding feature point to the current feature point, is defined as Aij, while a line segment, connecting the nearest surrounding feature point and the third nearest surrounding feature point to the current feature point, is defined as Bij. It should be noted that the determination of the order of combinations of the three surrounding feature points or the line segments used for calculation of the invariant Hij is not limited to the method(s) used in the above-described example (s), but may be performed by using any methods, including a method of performing the determination with respect to the length of a line segment connecting the surrounding feature points.

Next, the feature data calculating section 242 calculates, as a hash value (feature data) Hi, the value of a remainder of the following expression, and allows the storage section 12 to store the hash value. It should be noted that D in the following expression is a constant set in advance in accordance with the extent to which the range of the value of the remainder is set.

$$(Hi1 \times 10^3 + Hi2 \times 10^2 + Hi3 \times 10^1 + Hi4 \times 10^0)/D$$

Further, after having finished the extraction of the surrounding feature points with respect to one current feature point and the calculation of the hash value Hi, the feature data calculating section 242 determines the other feature point as the next current feature point, and performs extraction of surrounding feature points with respect to the next current feature point and calculation of a hash value, thus calculating the hash value using each feature point as a current feature point.

In the example shown in FIG. 7, after having finished the extraction of the surrounding feature points and the calculation of a hash value H1 using the feature point "a" as the current feature point P1, the feature data calculating section 242 extracts the surrounding feature points and calculates a hash value H2 using the feature point "b" as the current feature point P2. As shown in FIG. 7, when the feature point "b" is used as the current feature point P2, the four feature points "a", "c", "e" and "f" are extracted as the surrounding feature points.

FIGS. 9A to 9D are explanatory diagrams each showing an example in which three surrounding feature points are extracted with respect to the current feature point P2 to calculate feature data. As shown in FIGS. 9A to 9D, the feature data calculating section 242 extracts combinations of three points from among the surrounding feature points "a", "c", "e" and "f", i.e., a combination of the surrounding feature points "a", "e" and "f", a combination of the surrounding feature points "a", "c" and "e", a combination of the surrounding feature points "a", "f" and "c", and a combination of the surrounding feature points "e", "f" and "c", and calculates an invariant Hij for each of the combinations.

Figure 9A:
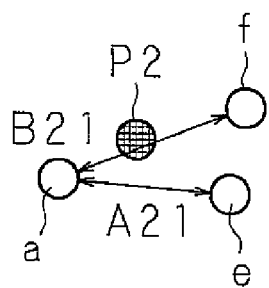
FIGS. 9A to 9D are explanatory diagrams each showing an example in which three surrounding feature points are extracted with respect to a current feature point P2 to calculate feature data.
Figure 9B:
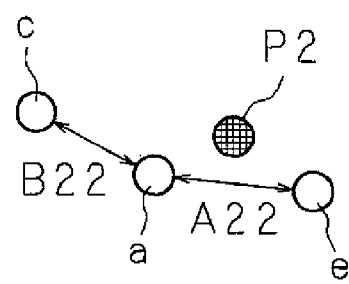
Figure 9C:
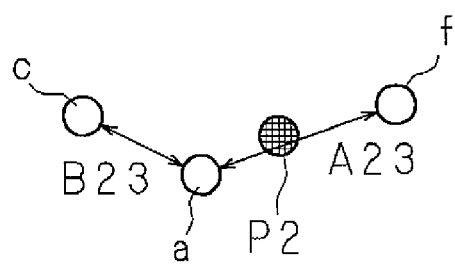
Figure 9D:
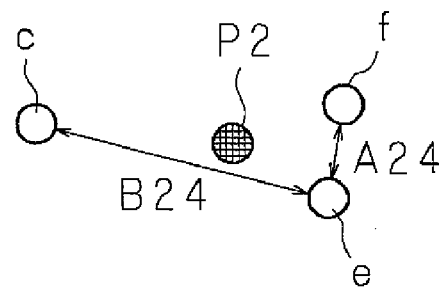

Similarly to the case of the current feature point P1 shown in FIGS. 8A to 8D, also in the case of the current feature point P2, an invariant H21 is calculated by H21=A21/B21 as shown in FIG. 9A, an invariant H22 is calculated by H22=A22/B22 as shown in FIG. 9B, an invariant H23 is calculated by H23=A23/B23 as shown in FIG. 9C, and an invariant H24 is calculated by H24=A24/B24 as shown in FIG. 9D. Further, the feature data calculating section 242 calculates the hash value H2 from the invariants H21, H22, H23 and H24, and allows the storage section 12 to store the hash value H2. Furthermore, the feature data calculating section 242 repeats the similar processes using each feature point as a current feature point, determines the hash value Hi when each feature point is used as a current feature point, and allows the storage section 12 to store the hash values.

Thus, the feature data calculating section 242 calculates feature data, which is the hash value Hi, for each feature point, and determines, as the feature data of the document data, a plurality of pieces of the calculated feature data. The feature data calculating section 242 functions as a generation section in the present invention.

It should be noted that the feature data calculation method described in this embodiment is just an example, and the other method may be used to calculate feature data. For example, the feature data may be calculated by using an alternative predetermined hash function. Further, when feature points adjacent to the current feature point are extracted, the number of the feature points to be extracted may be other than four, e.g., five or six, in calculating feature data. Furthermore, a process of calculating a plurality of pieces of feature data for one current feature point may be performed as follows, for example. Three feature points are further extracted from the extracted five feature points, feature data is calculated based on the distances between the three points, and feature data is calculated for the number of combinations of the three feature points which can be further extracted from the five feature points.

The feature data calculated by the feature data calculating section 242 is stored in the storage section 12 in association with the document data. The storage section 12 stores the document data corresponding to each page for each document including a plurality of pages, and further stores a document table associating the document data with documents, and a feature table associating the document data with the feature data. The storage section 12 functions as a feature data storage section in the present invention.

Figure 10:
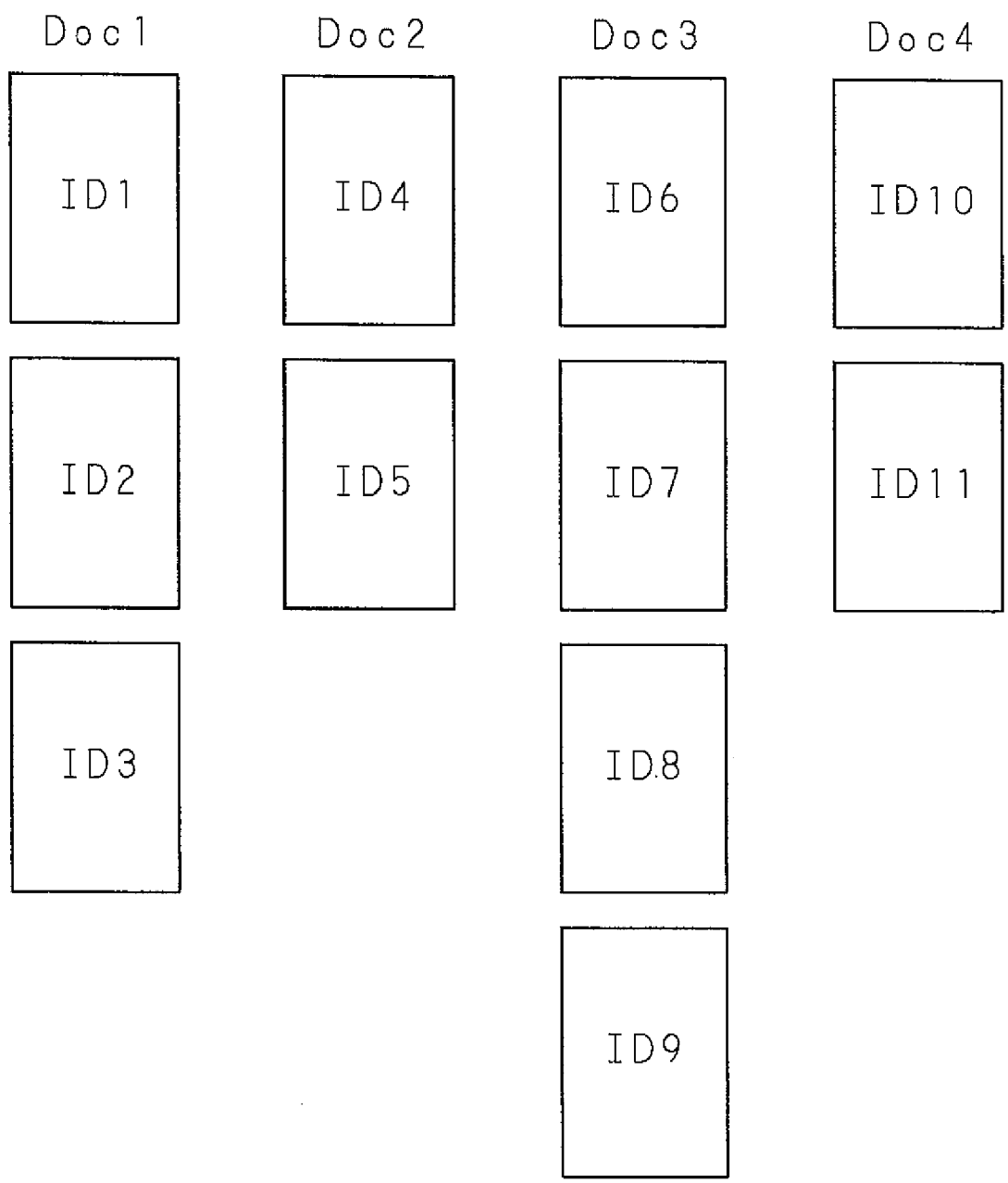
FIG. 10 is a conceptual diagram showing document data stored in a storage section.

FIG. 10 is a conceptual diagram showing document data stored in the storage section 12. The storage section 12 stores a plurality of pieces of document data corresponding to respective pages included in documents, and page indices ID1 ID2, . . . , individually indicating the document data, are assigned to the respective pieces of the document data. FIG. 11 is a conceptual diagram showing exemplary contents of a document table that associates the document data, stored in the storage section 12, with documents. In the table, document indices Doc1, Doc2, . . . , individually indicating the documents, are recorded, and page indices, indicating the document data corresponding to respective pages included in the documents, are recorded in association with the document indices. In the table, the number of pages of each document is further recorded, and the page indices whose number is the same as the number of pages are associated with each document index. Since the page indices are associated with the document indices, the storage section 12 stores the document indices and the document data in association with each other as shown in FIG. 10.

FIG. 12 is a conceptual diagram showing exemplary contents of a feature table that associates the document data, stored in the storage section 12, with feature data. This diagram shows an example in the case where feature data, which is a hash value, is calculated as E=127. In the table, respective pieces of feature data of 0 to 126 are recorded, and the page indices of document data are recorded in association with the feature data calculated for this document data. Since the same feature data might be calculated for a plurality of pieces of document data, a plurality of page indices are associated with each piece of feature data. Further, since a plurality of pieces of feature data are calculated for one piece of document data, the page index of one document data is associated with a plurality of pieces of feature data. The page indices are associated with the feature data; thus, the storage section 12 stores the feature data and the document data in association with each other.

Based on the feature data calculated by the feature data calculating section 242, the vote processing section 243 searches the feature table stored in the storage section 12, and votes for document data indicated by the page index associated with feature data identical to the calculated feature data. When a plurality of page indices are associated with one piece of feature data, voting is performed for all pieces of document data associated with this feature data. Since the feature data calculating section 242 calculates a plurality of pieces of feature data for the inputted document data, voting is performed for each piece of the feature data, and voting is performed more than once for document data similar to the inputted document data. The vote processing section 243 outputs the voting result for a plurality of pieces of the feature data, which are calculated by the feature data calculating section 242, to the similarity judgment processing section 244.

Based on the voting result inputted from the vote processing section 243, the similarity judgment processing section 244 judges whether the inputted document data is similar to any document data stored in the storage section 12, and outputs the judgment result to the document extracting section 245. Specifically, the similarity judgment processing section 244 checks the number of votes for each piece of document data stored in the storage section 12, and judges the document data having the greatest number of votes as the document data similar to the inputted document data. Alternatively, the similarity judgment processing section 244 may perform a process of normalizing the number of votes by dividing the number of votes for each piece of document data by the maximum possible number of votes, which is the number of pieces of feature data calculated by the feature data calculating section 242, thereby judging, as the document data similar to the inputted document data, the document data having the normalized number of votes equal to or greater than a predetermined threshold value. When document data similar to the inputted document data exists, the judgment result outputted by the similarity judgment processing section 244 includes the page index of the similar document data. The vote processing section 243 and the similarity judgment processing section 244 function as a judgment section in the present invention.

Based on the page index included in the judgment result inputted from the similarity judgment processing section 244, the document extracting section 245 searches the document table stored in the storage section 12, and obtains a document index associated with the page index. Thus, a document including a page corresponding to the document data, judged as being similar to the inputted document data, is specified. Next, the document extracting section 245 extracts a plurality of pieces of document data indicated by a plurality of page indices associated with the obtained document index, and outputs the extracted plurality of pieces of the document data to the color correction section 25. Thus, document data corresponding to all the pages included in the specified document is extracted. The document extracting section 245 functions as an extracting section in the present invention.

Figure 13:
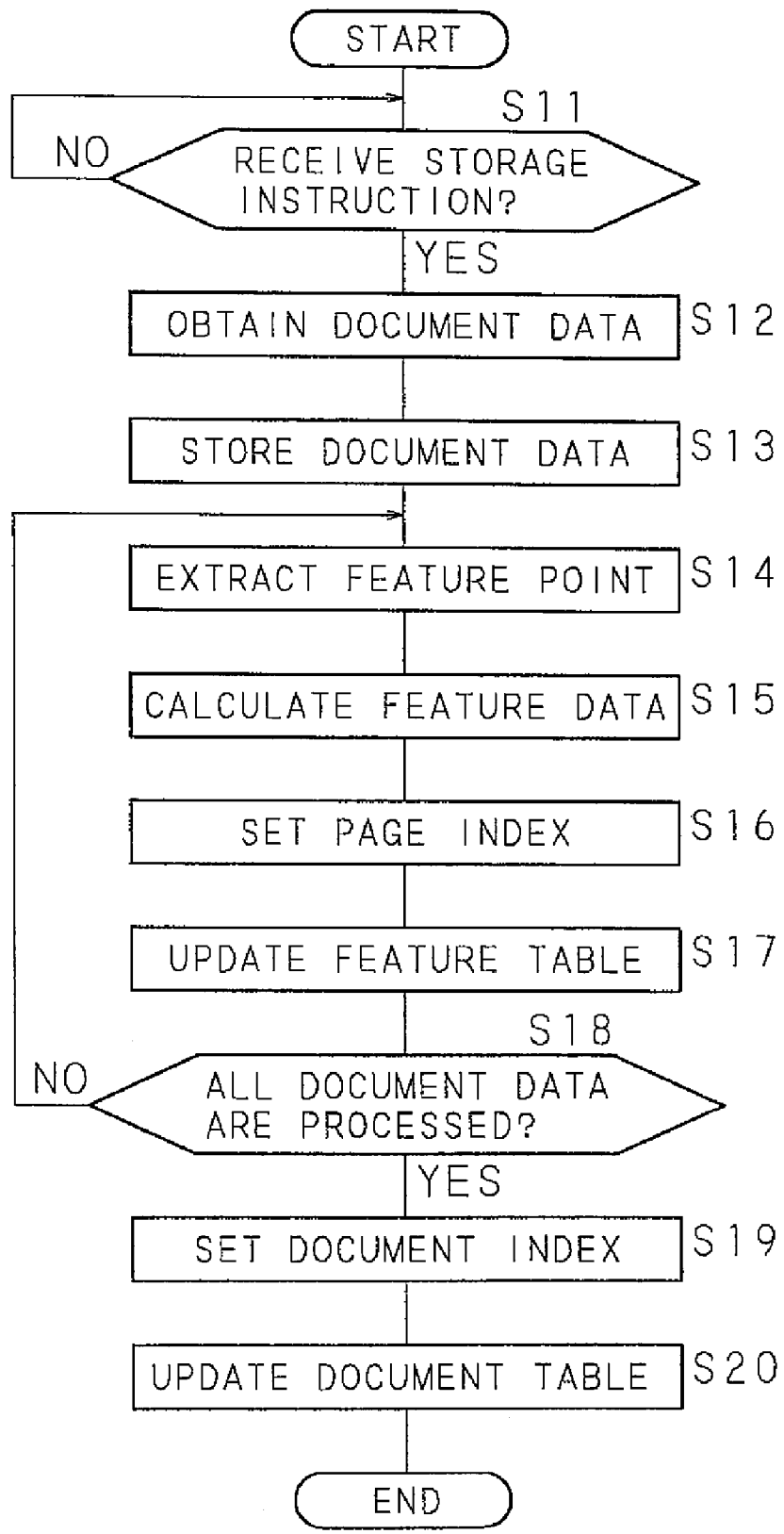
FIG. 13 is a flow chart showing a procedure of a document data storing process.

Next, the processes executed by the document extracting apparatus 100 of the present invention configured as described above will be described. The document extracting apparatus 100 executes a process of reading a document including a plurality of pages to store document data, and a process of reading a part of the document to extract document data corresponding to all the pages of the document. The process of extracting, from a part of a document, document data corresponding to all the pages of the document is the process included in the document extracting method of the present invention. FIG. 13 is a flow chart showing a procedure of a document data storing process.

The control section 11 of the document extracting apparatus 100 waits for the reception of a document data storage instruction given by user's manipulation of the operation panel 15 whenever necessary (Step S11). When no storage instruction is received (i.e., when the answer is NO in Step S11), the control section 11 continues waiting for the reception of a storage instruction. When a document data storage instruction has been received (i.e., when the answer is YES in Step S11), the user sets a document including a plurality of pages in the document extracting apparatus 100, and the color image input section 13 optically reads each page, thereby obtaining a plurality of pieces of document data serving as image data consisting of RGB signals (Step S12). The color image input section 13 outputs the document data to the color image processing section 2, the color image processing section 2 processes the document data in the following order: the A/D conversion section 20, the shading correction section 21, the input tone correction section 22, and the segmentation process section 23, and the control section 11 allows the storage section 12 to store the document data (Step S13).

In the document extracting process section 24, the feature point extracting section 241 extracts a plurality of feature points for one piece of document data by performing the above-described process (Step S14), the feature data calculating section 242 calculates feature data for each of the feature points by performing the above-described process, thereby calculating a plurality of pieces of feature data indicative of a feature of one piece of document data (Step S15). Then, the control section 11 generates a page index indicating one piece of document data, and adds the page index to document data stored in the storage section 12, thereby setting the page index (Step S16). In this case, the control section 11 generates a unique page index based on, for example, the order in which the document data has been inputted, or the date and time when the document data has been inputted. Subsequently, the control section 11 associates the feature data, calculated by the feature data calculating section 242, with the page index of the document data, thus updating the feature table as shown in FIG. 12 (Step S17).

Next, the control section 11 determines whether the process for associating the feature data with all pieces of the inputted document data has been finished (Step S18). When there is document data on which the process for associating the feature data therewith has not yet been performed (i.e., when the answer is NO in Step S18), the control section 11 returns the procedure to Step S14, and the feature point extracting section 241 extracts a feature point for the document data from which a feature point has not yet been extracted. When the process has been finished for all pieces of the document data (i.e., when the answer is YES in Step S18), a document index, indicating a document including a plurality of pages corresponding to a plurality of pieces of the obtained document data, is generated, thus setting the document index (Step S19). In this case, the control section 11 generates the document index based on the date and time, for example. It should be noted that the control section 11 may perform a process of receiving, at the operation panel 15, a document index desired by the user.

Then, the control section 11 associates the generated document index with the page index of the document data, thus updating the document table stored in the storage section 12 (Step S20), and ending the procedure. By performing the above-described processes, the document data of the document including a plurality of pages is stored in the storage section 12.

Figure 14:
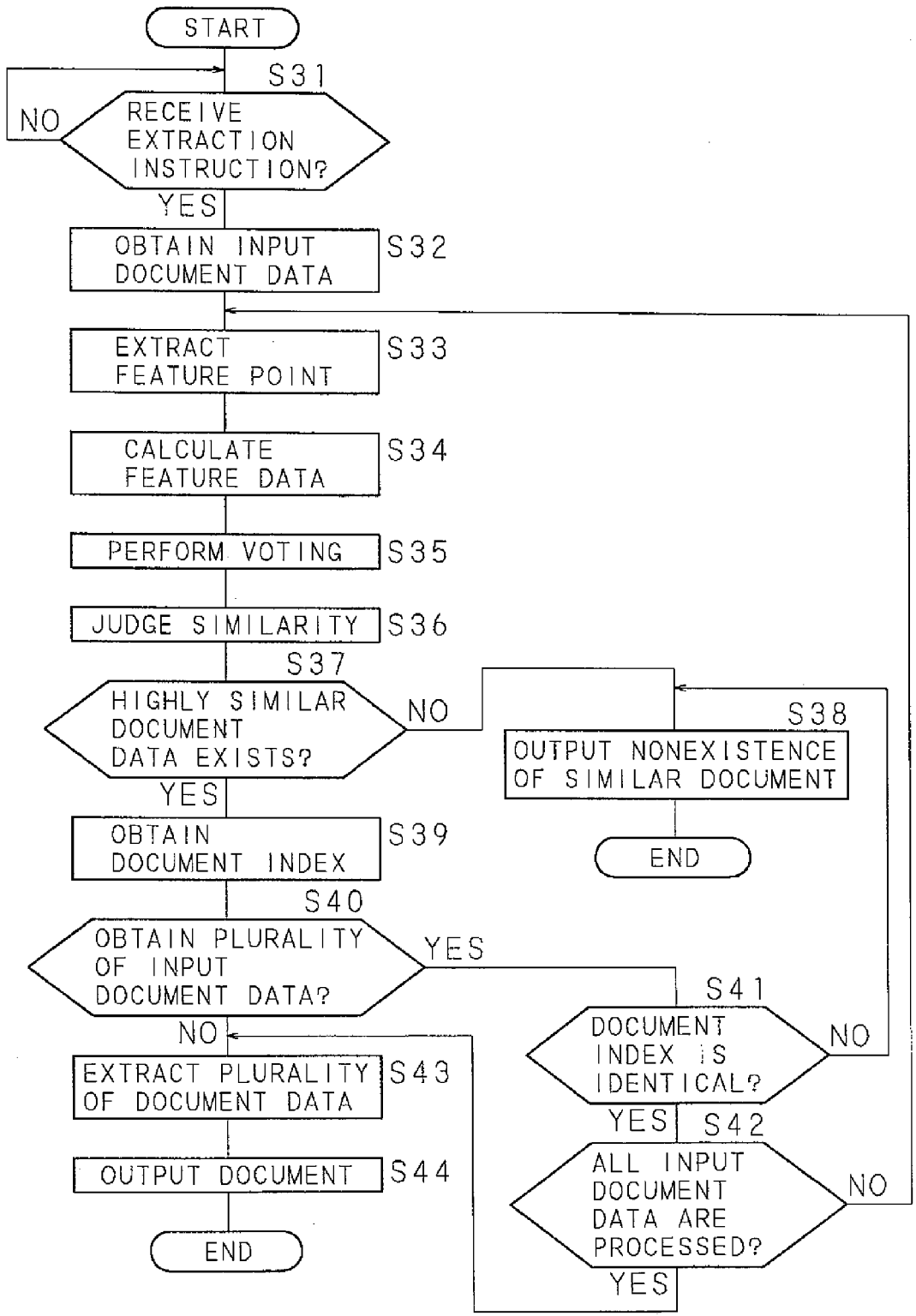
FIG. 14 is a flow chart showing a procedure of a document data extracting process.

FIG. 14 is a flow chart showing a procedure of a document data extracting process. The control section 11 of the document extracting apparatus 100 waits for the reception of a document data extraction instruction given by user's manipulation of the operation panel 15 whenever necessary (Step S31). When no extraction instruction is received (i.e., when the answer is NO in Step S31), the control section 11 continues waiting for the reception of an extraction instruction. When an image data extraction instruction has been received (i.e., when the answer is YES in Step S31), the user sets some of pages, included in a document including a plurality of pages, in the document extracting apparatus 100, and the color image input section 13 optically reads the set pages, thereby obtaining input document data serving as image data consisting of RGB signals (Step S32).

The color image input section 13 outputs the input document data to the color image processing section 2, the color image processing section 2 processes the input document data in the following order: the A/D conversion section 20, the shading correction section 21, the input tone correction section 22, and the segmentation process section 23, and the feature point extracting section 241 extracts a plurality of feature points for the input document data in the document extracting process section 24 (Step S33). The feature data calculating section 242 calculates feature data for each feature point extracted by the feature point extracting section 241, thereby calculating a plurality of pieces of feature data indicative of features of the input document data (Step S34).

Then, the vote processing section 243 searches the feature table stored in the storage section 12 for each piece of feature data calculated by the feature data calculating section 242, and performs a process of voting for document data indicated by the page index associated with the calculated feature data (Step S35). Based on the voting result obtained by the vote processing section 243, the similarity judgment processing section 244 judges whether the input document data is similar to any document data stored in the storage section 12 (Step S36). In this case, the similarity judgment processing section 244 judges, as document data highly similar to the input document data, document data having the greatest number of votes among the document data having the minimum number of votes required, or document data having the normalized number of votes equal to or greater than a predetermined threshold value.

Subsequently, the control section 11 determines whether the judgment result obtained by the similarity judgment processing section 244 indicates the existence of the highly similar document data (Step S37). When the judgment result indicates the nonexistence of the highly similar document data (i.e., when the answer is NO in Step S37), the control section 11 outputs information indicating the nonexistence of a document similar to the document read using the color image input section 13 by the user (Step S38). Specifically, the control section 11 allows the display section of the operation panel 15 to display character information indicating the nonexistence of the similar document, or allows the color image forming section 14 to form an image indicating the nonexistence of the similar document by characters. After having finished Step S38, the document extracting apparatus 100 ends the document data extracting process.

In Step S37, when the judgment result indicates the existence of the highly similar document data (i.e., when the answer is YES in Step S37), the document extracting section 245 searches the document table stored in the storage section 12, and obtains a document index associated with the page index of the document data that is judged as being highly similar to the input document data by the similarity judgment processing section 244 (Step S39). Then, the control section 11 determines whether a plurality of pieces of input document data corresponding to a plurality of pages are obtained (Step S40). When the obtained input document data is input document data corresponding to one page (i.e., when the answer is NO in Step S40), the document extracting section 245 extracts a plurality of pieces of document data indicated by a plurality of page indices associated with the obtained document index in the document table (Step S43). Thus, all pieces of the document data concerning the document including pages corresponding to the document data highly similar to the input document data are extracted.

The document extracting section 245 outputs the extracted document data to the color correction section 25, the document data is processed in the following order: the color correction section 25, the black generation and under color removal section 26, the spatial filter process section 27, the output tone correction section 28, and the tone reproduction process section 29, and then the color image processing section 2 outputs the document data to the color image forming section 14. The color image forming section 14 forms an image based on a plurality of pieces of the document data serving as image data, thus performing a document output process for outputting the document including a plurality of pages corresponding to a plurality of pieces of the document data (Step S44). After having finished Step S44, the document extracting apparatus 100 ends the document data extracting process.

When a plurality of pieces of the input document data corresponding to a plurality of pages are obtained in Step S40 (i.e., when the answer is YES in Step S40), the control section 11 determines whether the document indices obtained for the respective pieces of the input document data are identical (Step S41). When the document indices are not identical (i.e., when the answer is NO in Step S41), the control section 11 advances the procedure to Step S38, and outputs information indicating that no similar document exists.

When the document indices are identical in Step S41 (i.e., when the answer is YES in Step S41), the control section 11 determines whether the similarity judgment process is finished for all pieces of the input document data (Step S42). When input document data, on which the similarity judgment process has not yet been performed, exists (i.e., when the answer is NO in Step S42), the control section 11 returns the procedure to Step S33, and the feature point extracting section 241 extracts a feature point for input document data from which a feature point has not yet been extracted. When the similarity judgment process has been finished for all pieces of the input document data (i.e., when the answer is YES in Step S42), the document extracting apparatus 100 advances the procedure to Step S43, extracts document data concerning the document including pages corresponding to document data highly similar to the input document data, and outputs the document.

It should be noted that one piece of document data is highly similar to the input document data in the above-described process. However, when there are a plurality of pieces of document data, each having the normalized number of votes equal to or greater than a predetermined threshold value, the document extracting apparatus 100 may perform a process of judging the plurality of pieces of the document data as the document data highly similar to the input document data. In such a case, a process of concurrently outputting documents concerning each of the plurality of pieces of the document data may be performed, or a process of displaying, on the display section of the operation panel 15, an image of a page corresponding to each piece of the document data judged as having high similarity, and allowing the user to select the valid document data.

As described above in detail, in the present invention, the document extracting apparatus 100 stores, in the storage section 12, document data corresponding to each page included in a document, and further stores feature data indicative of a feature of the document data, and a document index indicating the document in association with the document data. When input document data has been obtained, the document extracting apparatus 100 generates feature data from the input document data, judges similarity between the input document data and document data based on the feature data, obtains a document index associated with document data highly similar to the input document data, and extracts a plurality of pieces of document data associated with the obtained document index. Thus, a document including a page corresponding to the document data, judged as being similar to the input document data, is specified, and the document data corresponding to all the pages included in the specified document is extracted. In other words, based on input document data corresponding to a part of a document including a plurality of pages, document data corresponding to all the pages of the document can be extracted. Accordingly, even if a document including a plurality of pages has a missing part due to loss or soil, for example, it is possible to easily extract document data for all the pages of the document from a database in which the document data is stored in advance.

Further, in order to judge document data similarity, the document extracting apparatus 100 of the present invention stores a plurality of pieces of feature data for one piece of document data, votes for document data associated with the same feature data for each piece of feature data generated for the input document data, and judges, as the document data highly similar to the input document data, the document data having the greatest number of votes or the number of votes equal to or greater than a predetermined amount. Since the document data, having a large number of pieces of identical feature data among the plurality of pieces of the feature data, is judged as having high similarity, more accurate similarity judgment can be carried out. Accordingly, it is possible to avoid, as much as possible, committing a folly that document data, which is not similar to the input document data, is erroneously judged as the highly similar document data and the document data different from the target data is thus extracted.

Furthermore, when a plurality of pieces of input document data are obtained and document indices associated with document data highly similar to respective: pieces of input document data are identical, the document extracting apparatus of the present invention extracts a plurality of pieces of document data associated with the identical document indices. Thus, a document can be extracted based on a plurality of pages, and the possibility of erroneously extracting document data different from the target data can be further reduced. For example, even if documents similar to each other exist, the target document data can be extracted with reliability.

Moreover, in the present invention, a feature point corresponding to a centroid of a character, a graphic, a photograph and the like on a document represented by document data is extracted from the document data, and feature data represented by a numerical value is calculated based on the relative positional relationship among a plurality of the extracted feature points. The feature data calculated in this manner is compared between document data, thus searching for document data; therefore, as compared with conventional methods such as the search performed by making bitmap data comparison, or the search performed by making comparisons between features serving as a large number of character codes extracted from a document, the data amount necessary for performing a document data searching process is considerably reduced. Accordingly, in the present invention, the time required for the document data searching process is reduced compared with the conventional techniques. Besides, in the present invention, the document data search is performed by making comparisons between feature data obtained based on the relative positional relationship of a plurality of feature points, and therefore, there is no need to perform image alignment between document data. Accordingly, in the present invention, it is possible to search for document data with higher accuracy compared with the conventional techniques.

It should be noted that the present embodiment has been described as an embodiment in which document data serving as color image data is handled, but the present invention is not limited to this embodiments Alternatively, the document extracting apparatus 100 of the present invention may be embodied so as to handle monochrome document data.

Further, the present embodiment has been described as an embodiment in which the color image input section 13 serving as a scanner is used as the document data obtaining section in the present invention, but the present invention is not limited to this embodiment. Alternatively, the document extracting apparatus 100 of the present invention may be embodied so as to include, as the document data obtaining section, an interface for receiving document data from an external scanner or PC. Furthermore, document data according to the present invention is not limited to image data optically read from a document, but may alternatively be application data such as text data created by a PC utilizing an application program. In such a case, the document extracting apparatus 100 receives, at the interface functioning as the document data obtaining section, document data serving as application data, and executes the processes according to the present invention.

Moreover, the present embodiment has been described as embodiment in which the obtained document data is stored, and a process of extracting necessary document data from among the stored document data is performed, but the present invention is not limited to this embodiment. Alternatively, the document extracting apparatus 100 of the present invention may be embodied so as to use, for example, a method of attaching the storage section 12 storing document data in advance, thus performing a document data extracting process without performing any previous storing process. In addition, the present embodiment has been described as an embodiment in which a process of extracting necessary document data from document data stored in the storage section 12 contained in the document extracting apparatus 100 is performed, but the present invention is not limited to this embodiment. Alternatively, the document extracting apparatus 100 of the present invention may be embodied so as to perform a process of extracting necessary document data from document data stored in an external document storage section such as a storage device or a server device connected via a communication network.

Embodiment 2

Embodiment 2 will be described as an embodiment in which when there are a plurality of pieces of document data highly similar to input document data, input document data is further obtained to narrow down image data. The inner configuration of a document extracting apparatus according to the present embodiment is similar to that of the document extracting apparatus according to Embodiment 1 described with reference to FIGS. 1 to 3. Further, the stored contents of the storage section 12 according to the present embodiment is similar to those of the storage section 12 according to Embodiment 1 described with reference to FIGS. 11 and 12. Furthermore, the document data storing process of the document extracting apparatus according to the present embodiment is similar to that of the document extracting apparatus according to Embodiment 1 described with reference to the flow chart of FIG. 13.

Figure 15:
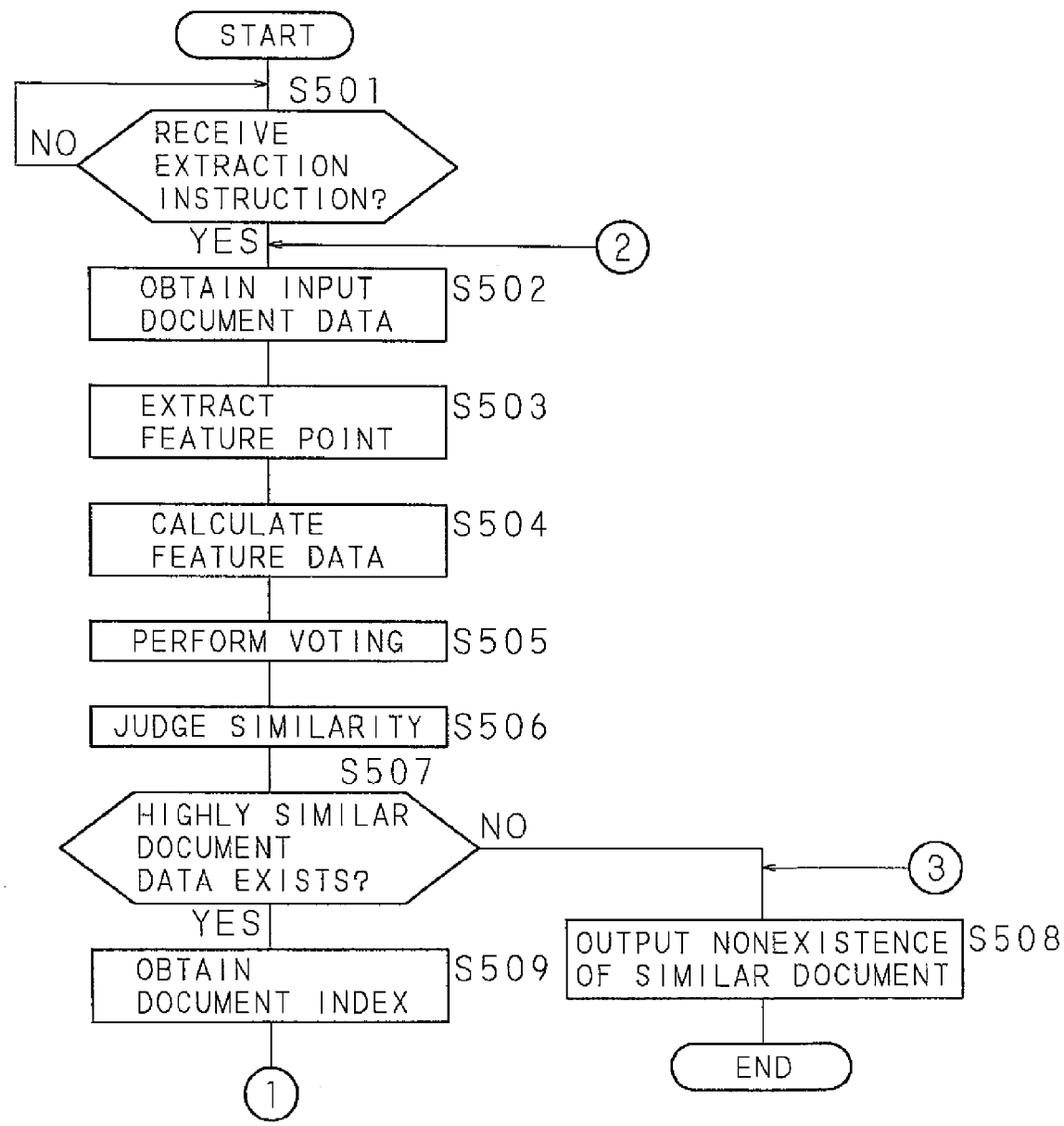
FIG. 15 is a flow chart showing a procedure of a document data extracting process.
Figure 16:
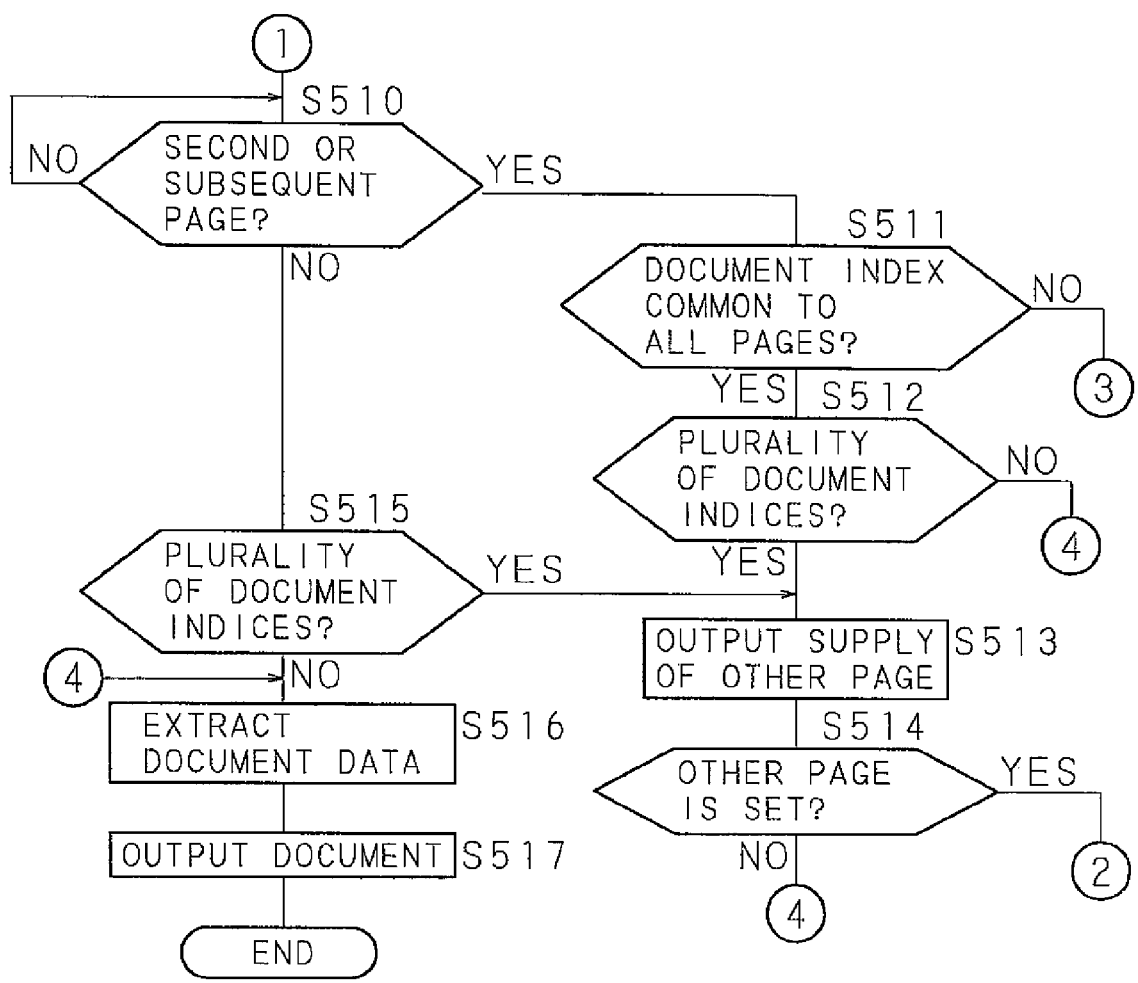
FIG. 16 is a flow chart showing the procedure of the document data extracting process.

FIGS. 15 and 16 each illustrate a flow chart showing a procedure of a document data extracting process performed by the document extracting apparatus according to Embodiment 2. The control section 11 of the document extracting apparatus 100 waits for the reception of a document data extraction instruction given by users manipulation of the operation panel 15 whenever necessary (Step S501). When no extraction instruction is received (i.e., when the answer is NO in Step S501), the control section 11 continues waiting for the reception of an extraction instruction. When an extraction instruction of image data has been received (i.e., when the answer is YES in Step S501), the user sets some of pages, included in a document including a plurality of pages, in the document extracting apparatus 100, and the color image input section 13 optically reads one of the set pages, thereby obtaining input document data serving as image data consisting of RGB signals (Step S502).

The color image input section 13 outputs the input document data to the color image processing section 2, the color image processing section 2 processes the input document data in the following order: the A/D conversion section 20, the shading correction section 21, the input tone correction section 22, and the segmentation process section 23, and the feature point extracting section 241 extracts a plurality of feature points for the input document data in the document extracting process section 24 (Step S503). The feature data calculating section 242 calculates feature data for each feature point extracted by the feature point extracting section 241, thereby calculating a plurality of pieces of feature data indicative of features of the input document data (Step S504).

Then, the vote processing section 243 searches the feature table stored in the storage section 12 for each piece of feature data calculated by the feature data calculating section 242, and performs a process of voting for document data indicated by the page index associated with the calculated feature data (Step S505). Based on the voting result obtained by the vote processing section 243, the similarity judgment processing section 244 judges whether the input document data is similar to any document data stored in the storage section 12 (Step S506). In Step S506, the similarity judgment processing section 244 judges, as document data highly similar to the input document data, document data having the normalized number of votes equal to or greater than a predetermined threshold value.

Subsequently, the control section 11 determines whether the judgment result obtained by the similarity judgment processing section 244 indicates the existence of the document data highly similar to the input document data (Step S507). When the judgment result indicates the nonexistence of the highly similar document data (i.e., when the answer is NO in Step S507), the control section 11 outputs information indicating the nonexistence of a document similar to the document read using the color image input section 13 by the user (Step S508). After having finished Step S508, the document extracting apparatus 100 ends the document data extracting process.

In Step S507, when the judgment result indicates the existence of the document data highly similar to the input document data (i.e., when the answer is YES in Step S507), the document extracting section 245 searches the document table stored in the storage section 12, and obtains a document index associated with the page index of the document data that is judged as being highly similar to the input document data by the similarity judgment processing section 244 (Step S509). When there are a plurality of pieces of the document data highly similar to the input document data, a plurality of document indices are obtained in Step S509. Then, the control section 11 determines whether the input document data processed at the present time is input document data obtained by reading the second or subsequent page of a document including a plurality of pages (Step S510). When the input document data processed at the present time is input document data obtained by reading the first page of the document (i.e., when the answer is NO in Step S510), the control section 11 determines whether there are a plurality of document indices obtained in Step S509 (Step S515). When there is only a single document index obtained in Step S509 (i.e., when the answer is NO in Step S515), the document extracting section 245 extracts a plurality of pieces of document data indicated by a plurality of page indices associated with the obtained document index in the document table (Step S516).

The document extracting section 245 outputs the extracted document data to the color correction section 25, the document data is processed in the following order: the color correction section 25, the black generation and under color removal section 26, the spatial filter process section 27, the output tone correction section 28, and the tone reproduction process section 29, and then the color image processing section 2 outputs the document data to the color image forming section 14. The color image forming section 14 forms an image based on a plurality of pieces of the document data serving as image data, thus performing a document output process for outputting the document including a plurality of pages corresponding to a plurality of the document data (Step S517) After having finished Step S517, the document extracting apparatus 100 ends the document data extracting process.

When the input document data processed at the present time is input document data obtained by reading the second or subsequent page of the document (i.e., when the answer is YES in Step S510), the control section 11 determines whether there is a document index common to all the pages read thus far among the document indices obtained for the input document data corresponding to the pages read thus far from the document (Step S511). When there is no document index common to all the pages (i.e., when the answer is NO in Step S511), the control section 11 advances the procedure to Step S508, and outputs information indicating that no similar document exists.

When there is a document index common to all the pages read thus far (i.e., when the answer is YES in Step S511), the control section 11 determines whether there are a plurality of document indices common to all the pages (Step S512). When there is only a single document index common to all the pages (i.e., when the answer is NO in Step S512), the control section 11 advances the procedure to Step S516, and the document extracting section 245 extracts a plurality of document data indicated by a plurality of page indices associated with the obtained document index (Step S516). Then, the color image forming section 14 performs a document output process for outputting the document including a plurality of pages corresponding to a plurality of pieces of the document data (Step S517), and the document extracting apparatus 100 ends the procedure.

When there are a plurality of the obtained document indices in Step S515 (i.e., when the answer is YES in Step S515), or there are a plurality of document indices common to all the pages read thus far in Step S512 (i.e., when the answer is YES in Step S512), the control section 11 performs a process of outputting information indicating the supply of the other page of the document (Step S513). Specifically the control section 11 allows the display section of the operation panel 15 to display character information that requests the reading of a new page included in the document.

Next, the control section 11 determines whether the other page included in the document is set in the document extracting apparatus 100 by the user (Step S514). When the other page included in the document is set in the document extracting apparatus 100 (i.e., when the answer is YES in Step S514), the control section 11 returns the procedure to Step S502, and the color image input section 13 obtains input document data corresponding to the other page included in the document.

When the other page included in the document is not set in the document extracting apparatus 100 (i.e., when the answer is NO in Step S514), the control section 11 advances the procedure to Step S516. It should be noted that when the other page of the document is not set even after a predetermined period of time has elapsed since the end of the process of Step S513, or when an instruction for finishing the document reading has been received by user's operation of the operation panel 15, a process of determining that the other page of the document is not set may be performed. The control section 11 advances the procedure to Step S516; as a result, the document extracting section 245 extracts document data indicated by each page index associated with each of a plurality of document indices common to all the pages read thus far (Step S516), and the color image forming section 14 performs a document output process for outputting the document corresponding to the extracted document data (Step S517). Thus, the document extracting apparatus 100 outputs a plurality of documents corresponding to a plurality of the document indices. After finishing Step S517, the document extracting apparatus 100 ends the procedure.

As described above in detail, when there are a plurality of document indices associated with document data highly similar to input document data corresponding to a page read from a document, the document extracting apparatus according to the present embodiment requests input document data corresponding to the other page of the document, and obtains the input document data obtained by reading the other page of the document. Furthermore, the document extracting apparatus according to the present embodiment obtains a document index common to all the read pages and associated with document data highly similar to the input document data, and extracts a plurality of pieces of document data associated with the obtained document index. Thus, when there are a plurality of document indices of the document data judged as being similar to the input document data, the document indices are narrowed down by utilizing also the other page of the document, and the document indices are repeatedly narrowed down until the document index of the document data similar to the input document data is judged. Accordingly, the utilization of a plurality of pages makes it possible to perform more accurate similarity judgment, and to extract desired document data with high precision.

Embodiment 3

Embodiments 1 and 2 have each been described as an embodiment in which any document can be outputted based on input document data corresponding to one page, but Embodiment 3 will be described as an embodiment in which a stricter output condition is set for a specific document. The inner configuration of a document extracting apparatus according to the present embodiment is similar to that of the document extracting apparatus according to Embodiment 1 described with reference to FIGS. 1 to 3.

FIG. 17 is a conceptual diagram showing exemplary contents of a document table according to Embodiment 3, which associates document data, stored in the storage section 12, with documents. In this table, page indices and the numbers of pages are recorded in association with document indices Doc 1, Doc2, . . . , which individually indicate documents, and furthermore, output conditions required to output documents are recorded in association with the document indices. In the example shown in FIG. 17, no output conditions are associated with the document indices Doc 1 to Doc 4, but output conditions are associated with the document indices Doc 21 and Doc 51. The output condition associated with the document index Doc 21 requires that both pieces of document data corresponding to the page indices ID 21 and ID 25, among the page indices ID 21 to ID 28 associated with the document index, are similar to the input document data. Further, the output condition associated with the document index Doc 51 requires that document data associated with three or more page indices, among the page indices ID 51 to ID 55 associated with the document index, is similar to the input document data. Furthermore, the contents of the feature table according to the present embodiment, which associates the document data stored in the storage section 12 with feature data, are similar to those of the feature table according to Embodiment 1 described with reference to FIG. 12.

Furthermore, the document data storing process performed by the document extracting apparatus according to the present embodiment is similar to that of Embodiment 1 described with reference to the flow chart of FIG. 13. Moreover, the document data extracting process performed by the document extracting apparatus according to the present embodiment is substantially similar to that of Embodiment 1 described with reference to the flow chart of FIG. 14, or that of Embodiment 2 described with reference to FIGS. 15 and 16, but the present embodiment differs from Embodiment 1 or 2 in the contents of the document output process of Step S44 or Step S517.

Figure 18:
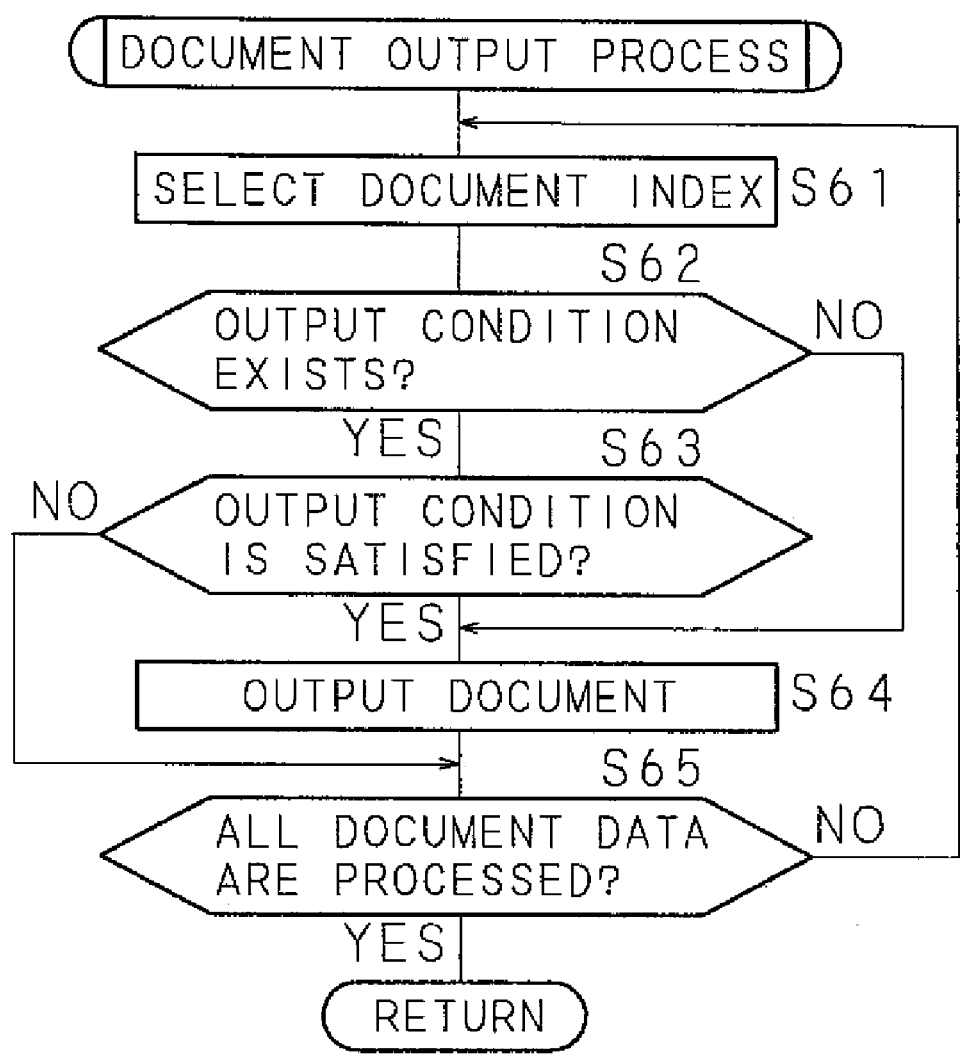
FIG. 18 is a flow chart showing a procedure of a document output process.

FIG. 18 is a flow chart showing a procedure of a document output process performed by the document extracting apparatus according to Embodiment 3. In the document data extracting process, the document extracting apparatus 100 according to the present embodiment executes the processes of Steps S31 to S43 shown in FIG. 14, or Steps S501 to S516 shown in FIGS. 15 and 16. In the document output process of Step S44 or Step S517, the control section 11 first selects a document index associated with one piece of document data among document data extracted by the document extracting section 245 in Step S43 or Step S516 (Step S61). Next, the control section 11 searches the document table stored in the storage section 12, and determines whether an output condition is associated with the selected document index (Step S62). When an output condition is associated with the selected document index (i.e., when the answer is YES in Step S62), the control section 11 determines whether the output condition associated with the document index is satisfied (Step S63).

For example, if the document index Doc 21 shown in FIG. 17 is selected, the output condition is determined to be satisfied when both of pieces of document data corresponding to ID 21 and ID 25 are judged as being similar to input document data in Step S37 or Step S507. When the document data corresponding to either ID 21 or ID 25 has not been judged as being similar to the input document data, the output condition is determined to be not satisfied. Further, if the document index Doc 51 is selected, the output condition is determined to be satisfied when document data corresponding to three or more page indices, among the page indices ID 51 to ID 55, is judged as being similar to the input document data in Step S37 or Step S507. When only document data corresponding to less than three page indices is judged as being similar to the input document data, the output condition is determined to be not satisfied.

When no output condition is associated with the document index in Step S62 (i.e., when the answer is NO in Step S62), or the output condition associated with the document index is satisfied in Step S63 (i.e., when the answer is YES in Step S63), the color image forming section 14 forms an image based on the document data indicated by each page index associated with the selected document index, thus outputting the document corresponding to the selected document index (Step S64). For example, since no output condition is set for documents corresponding to the document indices Doc 1 to Doc 4 shown in FIG. 17, these documents are unconditionally outputted. Further, documents corresponding to the document indices Doc 21 and Doc 51 are each outputted when the output condition is satisfied. After having finished Step S64, the control section 11 advances the procedure to the next Step S65. When the output condition associated with the document index is not satisfied in Step S63 (i.e., when the answer is NO in Step S63), the control section 11 advances the procedure to the next Step S65 without outputting the document corresponding to the selected document index. In this manner, the control section 11 inhibits the output of document data for which the output condition is not satisfied.

Then, the control section 11 determines whether the processes for all pieces of the document data extracted in Step S43 or Step S516 have been finished (Step S65). When there is document data for which the process has not yet been finished (i.e., when the answer is NO in Step S65), the control section 11 returns the procedure to Step S61, and selects a document index that has not yet been selected from among the document indices associated with the document data extracted in Step S43 or Step S516. When the processes for all pieces of the document data extracted in Step S43 or Step S516 have been finished (i.e., when the answer is YES in Step S65), the control section 11 ends the document output process, and returns the procedure to the document data extracting process. After having finished the document output process, the document extracting apparatus 100 ends the document data extracting process.

As described above in detail, the document extracting apparatus according to the present embodiment determines an output condition for each document index in advance, and outputs only a document corresponding to the document index, for which the output condition is satisfied, when performing the document output process. In Embodiments 1 and 2, a document can be outputted based on input document data corresponding to one page; therefore, even in the case of an important document including secret information, all the document pages can be easily outputted based on one page of the document. In the present embodiment, the document extracting apparatus outputs a document for which an output condition is set, when the output condition is satisfied; therefore, by setting an output condition for an important document, the important document can be prevented from being easily outputted.

For example, an output condition may be set to require input document data and document data to be judged as being similar to each other for a plurality of pages, thus making it possible to prevent all the pages of an important document from being outputted based on one page of the document. Further, an output condition may be set to require input document data and specific document data to be judged as being similar to each other, thus making it impossible for a user who does not have a specific page of a document to extract the document from the document extracting apparatus. As specific document data, document data indicative of matching contents irrelevant to the main contents of a document including a plurality of pages may be stored. The matching contents preferably have a format totally different from that of the main contents of a document; for example, when the main contents of the document are in Japanese, the matching contents may be in English.

Thus, the document extracting apparatus according to the present embodiment makes it possible for a specific user who has specific matching document data to extract a document for which an output condition is set, and makes it impossible for the other user who does not have the specific matching document data to output an important document. Accordingly, in the present embodiment, an output condition is set for an important document including secret information, thereby making it possible to protect the secret information included in the document.

Embodiment 4

Figure 19:
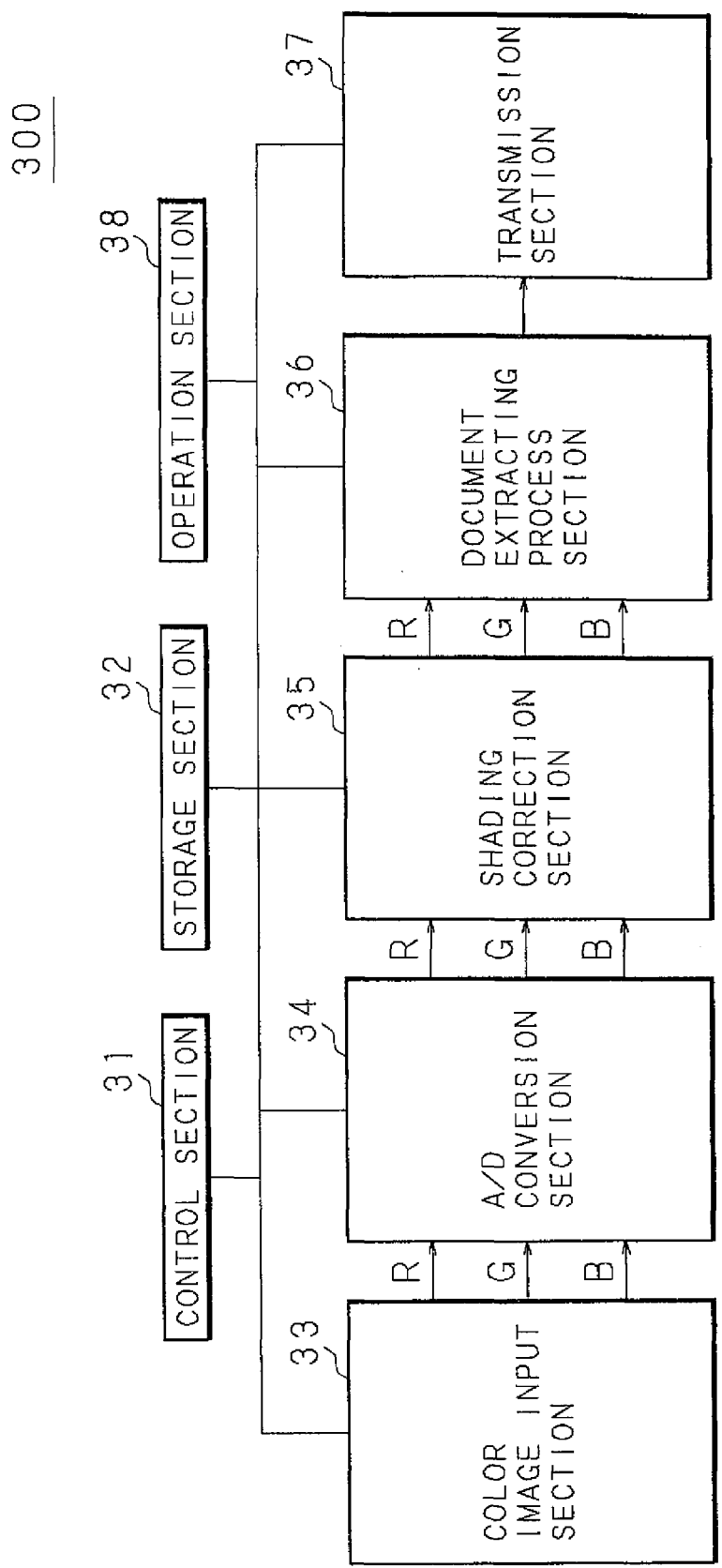
FIG. 19 is a block diagram showing a functional configuration of an inner part of a document extracting apparatus.

Embodiments 1 to 3 have each been described as an embodiment in which the document extracting apparatus of the present invention serves as an image forming apparatus, but Embodiment 4 will be described as an embodiment in which the document extracting apparatus of the present invention serves as a scanner apparatus. FIG. 19 is a block diagram showing a functional configuration of an inner part of a document extracting apparatus 300 according to Embodiment 4 of the present invention. The document extracting apparatus 300 of the present invention includes: a control section 31 for controlling the operations of respective sections constituting the document extracting apparatus 300; a storage section 32 formed by a semiconductor memory or a hard disk, for example; and a color image input section 33 for optically reading a color image. The color image input section 33 is connected with an A/D conversion section 34, the A/D conversion section 34 is connected with a shading correction section 35, and the shading correction section 35 is connected with a document extracting process section 36. The document extracting process section 36 is connected with a transmission section 37 for transmitting document data to the outside. The storage section 32, the color image input section 33, the A/D conversion section 34, the shading correction section 35, the document extracting process section 36, and the transmission section 37 are connected to the control section 31. Furthermore, the control section 31 is connected with an operation section 38 for receiving a manipulation performed by a user.

Similarly to the storage section 12 provided in the document extracting apparatus 100 described in Embodiments 1 to 3, the storage section 32 stores document data corresponding to each page for each document including a plurality of pages, and further stores a document table associating the document data with documents, 25 and a feature table associating the document data with feature data. Furthermore, the transmission section 37 is connected with an external PC or image forming apparatus, for example.

The color image input section 33 includes a scanner provided with a CCD, decomposes a reflected light image from a document into RGB colors to read them by the CCD, and converts them into RGB analog signals to output the signals to the A/D conversion section 34. The A/D conversion section 34 converts the RGB analog signals into digital RGB signals, and outputs the digital RGB signals to the shading correction section 35.

The shading correction section 35 performs, on the RGB signals inputted from the A/D Conversion section 34, a process of removing various kinds of distortions generated in the illumination system, the image focusing system, and the image sensing system of the color image input section 33. Further, the shading correction section 35 performs a process of adjusting color balance of the RGB signals, and performs a process of converting the RGB reflectivity signals into density signals. Then, the shading correction section 35 outputs document data, serving as image data consisting of the processed RGB signals, to the document extracting process section 36.

The document extracting process section 36 is configured similarly to the document extracting process section 24 provided in the document extracting apparatus 100 described in Embodiments 1 to 3, and executes processes similar to those executed by the document extracting process section 24. Specifically, the document extracting process section 36 determines, as input document data, document data inputted from the shading correction section 35, executes processes similar to those shown in the flow chart of FIG. 14, or the flow charts of FIGS. 15 and 16, and extracts, from the storage section 32, a plurality of pieces of document data concerning a document including a page corresponding to document data highly similar to the input document data.

The control section 31 allows the transmission section 37 to transmit a plurality of pieces of the document data, extracted by the document extracting process section 36, to the outside, thereby outputting the extracted document data. The transmission section 37 transmits a plurality of pieces of the document data to an apparatus such as an external PC or image forming apparatus, and the external apparatus executes, for example, a process of forming an image based on a plurality of pieces of the document data.

As described above in detail, also in the present embodiment, document data corresponding to all the pages of a document can be extracted based on input document data corresponding to a part of the document including a plurality of pages similarly to Embodiments 1 to 3. Accordingly, also in the present embodiment, even if a document including a plurality of pages has a missing part due to loss or soil, for example, it is possible to easily extract document data for all the pages of the document from a database in which the document data is stored in advance.

Embodiment 5

Figure 20:
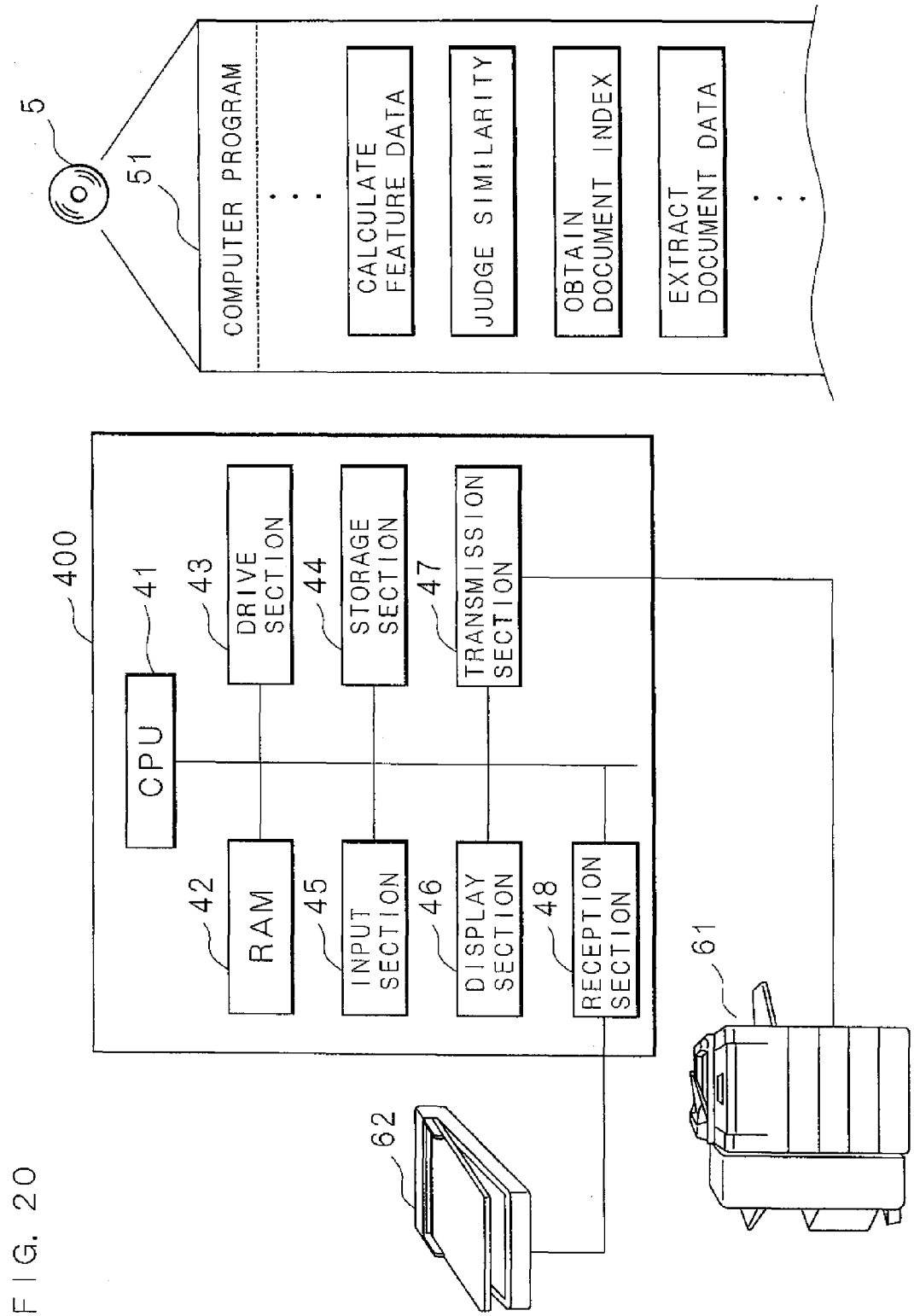
FIG. 20 is a block diagram showing an inner configuration of a document extracting apparatus.

Embodiment 5 will be described as an embodiment in which the document extracting apparatus of the present invention is implemented using a general-purpose computer. FIG. 20 is a block diagram showing an inner configuration of a document extracting apparatus 400 according to Embodiment 5 of the present invention. The document extracting apparatus 400 according to the present embodiment of the present invention is implemented by using a general-purpose computer such as a PC, and includes: a CPU 41 for performing computations; a RAM 42 for storing temporary information generated by the computations; a drive section 43 such as a CD-ROM drive for reading information from a memory product 5 of the present invention such as an optical disk; and a storage section 44 such as a hard disk. The CPU 41 allows the drive section 43 to read a computer program 51 of the present invention from the memory product 5 of the present invention, and allows the storage section 44 to store the read computer program 51. The computer program 51 is loaded from the storage section 44 into the RAM 42 when necessary, and the CPU 41 executes processes necessary for the document extracting apparatus 400 based on the loaded computer program 51.

The document extracting apparatus 400 further includes: an input section 45 such as a keyboard or a pointing device to which various pieces of information such as process instructions are inputted by user's manipulation; and a display section 46 such as a liquid crystal display for displaying various pieces of information. The document extracting apparatus 400 further includes: a transmission section 47 connected to an external output apparatus 61 such as an image forming device for outputting a document; and a reception section 48 connected to an external input apparatus 62 such as a scanner device to which document data is inputted. The transmission section 47 transmits document data to the output apparatus 61, and the output apparatus 61 outputs a document based on the document data. The input apparatus 62 generates document data by optically reading a document to transmit the generated document data to the document extracting apparatus 400, and the reception section 48 receives the document data transmitted from the input apparatus 62. The reception section 48 functions as a document data obtaining section in the present invention.

Similarly to the storage section 12 provided in the document extracting apparatus 100 described in Embodiments 1 to 3, the storage section 44 stores document data corresponding to each page for each document including a plurality of pages, and further stores a document table associating the document data with documents, and a feature table associating the document data with feature data.

The CPU 41 loads the computer program 51 of the present invention into the RAM 42, and executes processes according to the document extracting method of the present invention in accordance with the loaded computer program 51. Specifically, when document data has been inputted from the input apparatus 62 to the reception section 48, the CPU 41 determines, as input document data, the inputted document data, and performs processes similar to those shown in the flow chart of FIG. 14, or the flow charts of FIGS. 15 and 16, thereby extracting, from the storage section 44, a plurality of pieces of document data concerning a document including a page corresponding to document data highly similar to the input document data. The CPU 41 transmits a plurality of pieces of the extracted document data from the transmission section 47 to the output apparatus 61, and the output apparatus 61 outputs a document including a plurality of pages based on the document data. It should be noted that the CPU 41 may perform a process of handling, as document data, application data such as text data created by utilizing an application program.

As described above in detail, also in the present embodiment, document data corresponding to all the pages of a document can be extracted based on input document data corresponding to a part of the document including a plurality of pages similarly to Embodiments 1 to 4. Accordingly, also in the present embodiment, even if a document including a plurality of pages has a missing part due to loss or soil, for example, it is possible to easily extract document data for all the pages of the document from a database in which the document data is stored in advance.

It should be noted that the present embodiment has been described as an embodiment in which a process of extracting necessary document data from the document data stored in the storage section 44 contained in the document extracting apparatus 400 is performed, but the present invention is not limited to this embodiment. Alternatively, the document extracting apparatus 400 of the present invention may be embodied so as to perform a process of extracting necessary document data from the document data stored in an unshown external document storage section such as a storage device or a server device connected via a communication network.

It should be noted that the memory product 5 of the present invention, in which the computer program 51 of the present invention is recorded, may be embodied by any of: a magnetic tape; a magnetic disk; a portable hard disk; an optical disk such as a CD-ROM, an MO, an MD or a DVD; and a card-type memory product such as an IC card (including a memory card) or an optical card. Furthermore, the memory product 5 of the present invention may be a semiconductor memory which can be inserted into the document extracting apparatus 400 and from which contents recorded in the memory product 5 can be read by the CPU 41, i.e., a mask ROM, an EPROM (Erasable Programmable Read Only Memory), an EEPROM (Electrically Erasable Programmable Read Only Memory), a flash ROM or the like.

Moreover, the computer program 51 of the present invention may be embodied so as to be downloaded into the document extracting apparatus 400 from an unshown external server device connected to the document extracting apparatus 400 via a communication network such as the Internet or LAN, and stored in the storage section 44. In such an embodiment, a program necessary for downloading the computer program 51 may be stored in the storage section 44 in advance, or may be read from a predetermined memory product using the drive section 43 so as to be stored in the storage section 44, and loaded into the RAM 42 when necessary.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A document extracting method for extracting specific document data from stored document data, the method comprising steps of:
    storing a document index in association with document data corresponding to each page included in the document;
    the document index including a page index having page indices respectively indicating pages of the document data and a number of pages for each document;
    storing feature data, calculated based on a feature point extracted from document data and indicative of a feature of the document data, in association with the document data;
    obtaining input document data serving as new document data;
    extracting a feature point from the obtained input document data;
    generating feature data indicative of a feature of the input document data based on the extracted feature point;
    comparing the generated feature data with the stored feature data, thereby judging similarity between the document data associated with the stored feature data, and the input document data;
    obtaining a document index associated with document data judged as document data highly similar to the input document data; and
    extracting a plurality of pieces of document data corresponding to a plurality of pages included in a document indicated by the obtained document index.

2. A document extracting apparatus comprising:
    a processing device;
    a storage device storing instructions that, when executed by the processing device, cause the processing device to implement:
    storing a document index, the document index including a page index having page indices respectively indicating pages of the document data and a number of pages for each document in association with document data corresponding to each page included in the document;
    storing feature data, calculated based on a feature point extracted from the document data and indicative of a feature of the document data, in association with the document data;
    obtaining input document data serving as new document data;
    extracting a feature point from the input document data;
    generating feature data indicative of a feature of the input document data based on the extracted feature point;
    comparing the generated feature data with the stored feature data, thereby judging similarity between the document data associated with the feature data and the input document data;
    obtaining a document index associated with document data that is judged as document data highly similar to the input document data; and
    extracting a plurality of pieces of document data corresponding to a plurality of pages included in a document indicated by the obtained document index.

3. The document extracting apparatus according to claim 2, storing, in association with one piece of document data, a plurality of pieces of feature data indicative of a feature of the document data, wherein the generation step generates a plurality of pieces of feature data indicative of a feature of input document data, and
    wherein the judgment step includes:
    voting, for each of a plurality of pieces of the feature data generated by the generation step, for document data associated with feature data identical to the feature data; and
    deciding, as document data highly similar to the input document data, document data having the greatest number of votes or document data having the number of votes equal to or greater than a predetermined amount, among the stored document data.

4. The document extracting apparatus according to claim 2, wherein the document data obtaining step obtains a plurality of pieces of input document data,
    wherein the judgment step judges, for each of a plurality of pieces of the input document data, similarity between the stored document data and the input document data, and
    wherein when document index associated with document data highly similar to each of a plurality of pieces of the input document data is identical to each other, the document data extracting step extracts a plurality of pieces of document data corresponding to a plurality of pages included in a document indicated by the document index.

5. The document extracting apparatus according to claim 4, the apparatus further comprising:

requesting further input document data when a plurality of document indices associated with document data highly similar to input document data have been obtained, or when a plurality of document indices common to a plurality of pieces of the input document data, among document indices associated with document data highly similar to each of a plurality of pieces of the input document data, have been obtained.

6. The document extracting apparatus according to claim 2, wherein the document data obtaining step obtains input document data by optically reading a document.

7. The document extracting apparatus according to claim 2, further comprising:

storing, in association with a document index, a predetermined output condition necessary for outputting document data corresponding to each page included in a document indicated by the document index;

determining whether an output condition, associated with a document index associated with document data extracted by the document data extracting section, is satisfied;

outputting, when the output condition is determined to be satisfied, a plurality of pieces of document data corresponding to a plurality of pages included in a document indicated by the document index; and inhibiting, when the output condition is determined to be not satisfied, output of a plurality of pieces of document data corresponding to a plurality of pages included in a document indicated by the document index.

8. The document extracting apparatus according to claim 2, the apparatus further comprising:

forming a plurality of images based on a plurality of pieces of the document data extracted by the document data extracting section.

9. A non-transitory computer-readable memory product which stores a computer program for causing a computer to extract specific document data from document data stored inside or outside the computer, wherein the computer program comprises steps of:

causing the computer to extract a feature point from input document data that has been inputted;

causing the computer to generate feature data indicative of a feature of the input document data based on the extracted feature point;

causing the computer to compare the generated feature data with feature data indicative of a feature of the stored document data, thereby judging similarity between the stored document data and the input document data;

causing the computer to obtain a document index associated with document data judged as document data highly similar to the input document data the document index including a page index having page indices respectively indicating pages of the document data and a number of pages for each document; and causing the computer to extract a plurality of pieces of document data corresponding to a plurality of pages included in a document indicated by the obtained document index.

* * * * *